United States Patent
Colson et al.

(10) Patent No.: US 7,797,241 B2
(45) Date of Patent: Sep. 14, 2010

(54) GLOBAL INFORMATION NETWORK PRODUCT PUBLICATION SYSTEM

(75) Inventors: Thomas J. Colson, Clarence Center, NY (US); John E. Cronin, Milton, VT (US); Samuel C. Baxter, Fairport, NY (US); Robert Cantrell, Arlington, VA (US)

(73) Assignee: IP.com, Inc., West Henrietta, NY (US)

( * ) Notice: Subject to any disclaimer, the term of this patent is extended or adjusted under 35 U.S.C. 154(b) by 2549 days.

(21) Appl. No.: 09/931,492

(22) Filed: Aug. 16, 2001

(65) Prior Publication Data

US 2002/0072997 A1 Jun. 13, 2002

Related U.S. Application Data

(63) Continuation-in-part of application No. 09/661,009, filed on Sep. 13, 2000, now abandoned.

(51) Int. Cl.
G06F 17/30 (2006.01)

(52) U.S. Cl. .............................. 705/52; 707/1; 707/100; 707/101; 705/1

(58) Field of Classification Search ............... 705/1, 705/51, 52; 713/176; 707/1, 100, 101
See application file for complete search history.

(56) References Cited

U.S. PATENT DOCUMENTS

| | | | |
|---|---|---|---|
| 4,885,777 A | | 12/1989 | Takaragi et al. |
| 5,136,643 A * | | 8/1992 | Fischer ........................ 713/178 |
| 5,684,999 A | | 11/1997 | Okamoto |
| 5,727,156 A | | 3/1998 | Herr-Hoyman et al. |
| 5,740,425 A | | 4/1998 | Povilus |
| 5,765,170 A | | 6/1998 | Morikawa |
| 5,778,367 A | | 7/1998 | Wesinger, Jr. et al. ......... 707/10 |
| 5,870,552 A | | 2/1999 | Dozier et al. .......... 395/200.49 |
| 5,893,117 A * | | 4/1999 | Wang .......................... 707/203 |
| 5,991,751 A * | | 11/1999 | Rivette et al. .................. 707/1 |
| 6,038,561 A | | 3/2000 | Snyder et al. |
| 6,112,172 A | | 8/2000 | True et al. |
| 6,112,240 A | | 8/2000 | Pogue et al. |
| 6,154,725 A * | | 11/2000 | Donner .......................... 705/1 |
| 6,314,517 B1* | | 11/2001 | Moses et al. ................. 713/156 |
| 6,339,767 B1* | | 1/2002 | Rivette et al. .................. 707/2 |
| 6,401,206 B1* | | 6/2002 | Khan et al. ................. 713/176 |
| 6,556,992 B1* | | 4/2003 | Barney et al. .................. 707/6 |
| 6,662,178 B2* | | 12/2003 | Lee .............................. 707/3 |
| 6,947,909 B1* | | 9/2005 | Hoke, Jr. ..................... 705/54 |
| 7,085,755 B2* | | 8/2006 | Bluhm et al. .................. 707/3 |

(Continued)

*Primary Examiner*—Calvin L Hewitt, II
*Assistant Examiner*—John M Winter
(74) *Attorney, Agent, or Firm*—Simpson & Simpson, PLLC

(57) ABSTRACT

A system and a method of publishing an product document for clients for the purpose of publicly disclosing an invention to end users on the Global Information Network. The system includes a first Web site system having a publicly accessible database for storing a plurality of product documents received from clients. The Web site also includes a search engine accessible to the end user. The search engine is in electronic communication with the database and can receive a search request the end user, allowing the end user access to one or more of the product documents. The product document preferably includes a primary text file and attachment files which may include drawing files. The product documents may be digitally notarized and time/date stamped.

40 Claims, 31 Drawing Sheets

U.S. PATENT DOCUMENTS

2002/0083066 A1* 6/2002 Lee et al. .................... 707/100
2003/0033295 A1* 2/2003 Adler et al. .................... 707/3
2003/0120930 A1* 6/2003 Simpson et al. ............. 713/178
2005/0120217 A1* 6/2005 Fifield et al. ................ 713/176

* cited by examiner

Primary (Public) Publication Web Site

Auxiliary Site

GLOBAL INFORMATION NETWORK PRODUCT PUBLICATION SYSTEM

CROSS-REFERENCE TO RELATED APPLICATIONS

The instant application is a continuation-in-part of U.S. Ser. No. 09/661,009 filed Sep. 13, 2000 now abandoned.

FIELD OF THE INVENTION

The present invention relates to the field of electronic publishing; more specifically, it relates to a method and system for publishing product information by placing documents describing the product and commercial availability thereof in a searchable database via the Global Information Network (Internet).

BACKGROUND OF THE INVENTION

Patent portfolios are now regarded by many companies as an invaluable and necessary business asset. A patent portfolio is typically designed to cover a company's core technology, and often includes many patents related to the inventions surrounding the core technology. For example, if a company's core technology involves a special type of laser, the company may patent the special type of laser, as well as inventions related to the laser, such as methods for coating the laser mirrors, methods for fabricating devices using the laser, apparatus that uses the laser for particular applications (e.g., photolithography) and the like.

One reason for patenting the related inventions surrounding the core technology is to maintain freedom of action in practicing the core technology. For example, if the laser requires specially coated mirrors and another company or individual obtains related patents (e.g., on the mirror as an article of manufacture, or on the method for coating the mirror), then the value of the core laser patent is diminished because use of the laser will require licensing the laser mirror patents.

Unfortunately, the cost of applying for, prosecuting, and maintaining a single United States patent can cost many thousands of dollars. Filing corresponding patent applications and maintaining corresponding patents in other counties around the world further increases the cost. Thus, when large numbers of patents are involved, as is the case of a patent portfolio, the costs can become prohibitive, even for large companies.

One approach to reducing the cost of maximizing the value of core technologies is patenting the core inventions and publishing articles or papers disclosing inventions related to the core inventions. While disclosing related inventions donates the related inventions to the public, if done correctly, the core technology is protected and the related inventions will not be of much use to others outside the context of the core patent(s). More importantly, the related inventions will not be patentable by others since they are already in the public domain.

Inventions related to a core invention are often incorporated into a company's commercially available product line without being the subject of corresponding patent applications or defensive publications. If an invention is "on sale" in the United States more than one year prior the filing date of a competitor's patent application claiming the same invention, this fact is a statutory bar to patentability under 35 U.S.C. 102(b). However, from a practical standpoint, "on sale" issues are typically raised at the enforcement or litigation stage of a patent dispute because examiners in the United states Patent and Trademark Office have no centralized database of commercially available products as a body of searchable prior art. Many times, companies fail to keep historical documentation of their product lines and potentially valuable evidence is lost or inadvertently destroyed. In addition, companies do not have benefit of a commercially available product database for conducting patentability searches.

SUMMARY OF THE INVENTION

The method and system of the present invention allow for publishing searchable documents (hereinafter "product documents") providing information about commercially available products for establishing the existence of an "on sale" or other bar to prevent others from obtaining patent protection for inventions previously practiced in a commercially available product. Such product documents can serve an important role in protecting inventions related to or surrounding a core technology. A database of such product documents can also serve the inventor community as a readily accessible Global Information Network source of searchable prior art. Moreover, the product documents can be published anonymously so that competitors are prevented from triangulating the position of an organization's intellectual property efforts or strategy.

A first aspect of the present invention is a method of publishing a product document for a client for the purpose of establishing an "on sale" or other bar to patentability. The method includes the steps of providing a first Web site system and a publicly accessible database having stored therein a plurality of product documents; providing a search engine for use by end users, wherein the search engine receives a search request from an end user and searches the product document database to locate any product documents corresponding to the search request; allowing the end user access to the product documents located by the search engine; and receiving a product document and adding the product document to the database. In one embodiment, the client can specify what end users and user groups have permission to access the client's product document.

A second aspect of the present invention is a system for publishing, for a client, a product document received from a client's computer, for the purpose of establishing an "on sale" or other bar to patentability. The product document is accessible by an end user via an end user's computer connected to the Global Information Network. The system comprises a first Web site system having a computer system in communication with a publicly accessible database, the computer system being operable to receive a product document from the client's computer and add the product document to the database. The computer system of the first Web site system is also in communication with a search engine for receiving a search request from an end user's computer and operates to retrieve any matching product document(s) from the database in response to the search request and transmit the matching product document(s) to the end user's computer.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
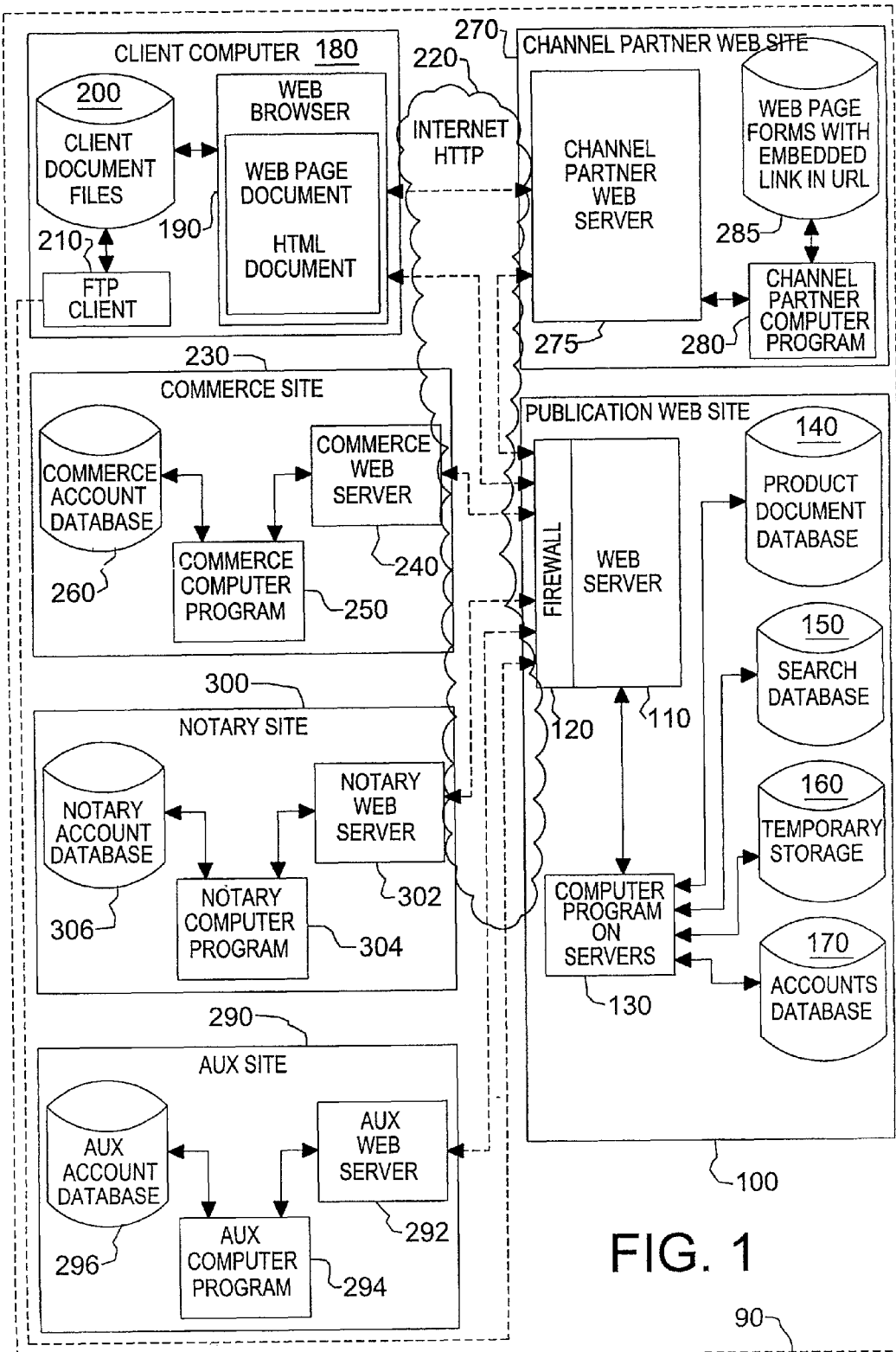
FIG. 1 is a high level architectural drawing illustrating the primary components of a system that operates in accordance to the present invention.

The present invention relates to the field of electronic publishing; more specifically, it relates to a method and system for placing product documents in a publicly accessible and searchable database via the Global Information Network.

Glossary of Terms and Acronyms

The following terms and acronyms are used throughout the detailed description:

Server: A program that responds to a request from another program, typically a Web browser, in a distributed system in which a program at one site sends a request to a program at another site and waits for a response. Typically the server responds by transmitting Web pages.

Web browser: A program that sends requests to another program in a distributed system in which a program at one site sends a request to a program at another site and waits for a response. Typically the Web browser receives Web pages from the server.

Hyperlink: A navigational link from one document to another. Typically, a hyperlink is displayed as an underlined word or phrase that can be selected by clicking on it using a mouse, which causes the Web browser to display the linked document.

Global Information Network: A collection of interconnected public and/or private networks that are linked together by a set of standard protocols such as TCP/IP and HTTP, to form a global, distributed network. The term "Global Information Network" is also intended to encompass changes and additions to existing standard protocols that may be made in the future. One embodiment of a Global Information Network is known as the "Internet".

World Wide Web ("Web"): A distributed collection of interlinked, user-viewable hypertext documents, commonly referred to as Web documents or Web pages, that are accessible via the Global Information Network. Currently, the primary standard protocol for allowing applications to locate and acquire Web documents is HTTP, and the Web pages are encoded using HTML. The term "Web" is also intended to encompass changes and additions to existing standard protocols that may be made in the future.

Web Site: A computer system for serving informational content over a network using the standard protocols of the World Wide Web. Typically, a Web site corresponds to a particular Global Information Network domain name, such as "IP.COM," and includes the content associated with a particular organization. As used herein, the term is generally intended to encompass both the hardware/software server components that serve the informational content over the network, and additional hardware/software components, including any non-standard or specialized components, that interact with the server components to perform services for Web site users.

SGML (Standard Generalized Markup Language): An international standard (ISO 8879) published in 1986. SGML prescribes a standard format for embedding descriptive markup within a document. SGML also specifies a standard method for describing the structure of a document. SGML forces each element in the structure, which is labeled with descriptive markup such as "chapter," "title" and "paragraph," to fit in the logical, predictable structure of the document.

XML (Extensible Markup Language): A document and data description language that is a subset of the SGML, yet provides the web transmission function of the HTML. It is not a fixed grammar, as is HTML, but is extensible, as is SGML.

HTML (Hyper Text Markup Language): Computer software codes for attaching presentation and linking attributes to informational content within documents. Documents sent to the Web browser contain HTML codes (referred to as "tags") embedded within the informational content of the document. When the Web document (or HTML document) is subsequently received by a Web browser, the codes are interpreted by the browser and used to parse and display the document. Additionally HTML tags can be used to create links to other Web documents (commonly referred to as "hyperlinks").

HTTP (Hyper Text Transport Protocol): The standard World Wide Web protocol used for the exchange of information (such as HTML documents, and Web browser requests for such documents) between a browser and a Web server. HTTP includes a number of different types of messages, which can be sent, from the client to the server to request different types of server actions. For example, a "GET" message, which has the format GET, causes the server to return the document or file located at the specified URL.

URL (Uniform Resource Locator): A unique address that fully specifies the location of a file or other resource on the Global Information Network. The general format of a URL is protocol://machine address:port/path/filename. The port specification is optional.

Branded Web page: A Web page having at least one of the display attributes of a channel partner Web page. A display attribute being one or more of the following: logo, color, layout, fonts and styles.

Co-branded Web page: A Web page having at least one display attribute of a channel partner's Web page and a publication Web site logo.

Global Information Network Invention Publication System

FIG. 1 is a high level architectural drawing illustrating the primary components of a system that operates in accordance to the present invention. Global Information Network publishing system 90 includes a publication Web site 100 comprised of a Web server having a firewall 120 linked to a computer program 130 which in turn is linked to a product document database 140, search database 150, a temporary storage unit 160, and an accounts database 170. Global Information Network system 90 also includes a client computer 180 comprising a Web browser 190, such as Microsoft's Internet Explorer or Netscape's Navigator, a set of client document files 200, and an optional FTP client 210. Client computer 180 may link to publication Web site 100 via Global Information Network 220 using standard HTTP protocol or using FTP protocol more directly. Global Information Network publication system 90 further includes a commerce site 230 comprising a commerce Web server 240 linked to a commerce computer program 250. Commerce computer 250 is in turn linked to a commerce account database 260. Commerce site 230 links to publication Web site 140 via Global Information Network 220.

Global Information Network publication system 90 may also include an optional channel partner Web site 270. A channel partner Web site includes hyperlinks to publication Web site 100. A channel partner is an organization that will place a link to publication Web site 100 on their own Web site in order to direct potential clients to publication Web site 100. The operation and relationship between publication Web site 100 and channel partner Web site 270 is described in U.S. patent application Ser. No. 09/609,605, filed on Jun. 30, 2000, which patent application is hereby incorporated by reference. Channel partner Web site 270 comprises a channel partner Web server 275 linked to a channel partner computer program 280. Channel partner computer program 280 is in turn linked to a Web page forms database 285 containing Web page forms with embedded hyperlinks to publication site 100. The embedded hyperlinks contain URL's to allow identification of channel partner Web site 270 by publication Web site 100. Channel partner Web site 270 may communicate to client computer 180 and publication Web site 100 via Global Information Network 220.

Global Information Network publication system 90 may include an optional auxiliary Web site 290 comprised of an auxiliary Web server 292 linked to an auxiliary computer program 294 linked to an auxiliary database 296.

Global Information Network publication system 90 further includes a notarization vender Web site 300 comprised of a notary Web server 302 linked to a notary computer program 304 linked to a notary database 306.

Figure 2:
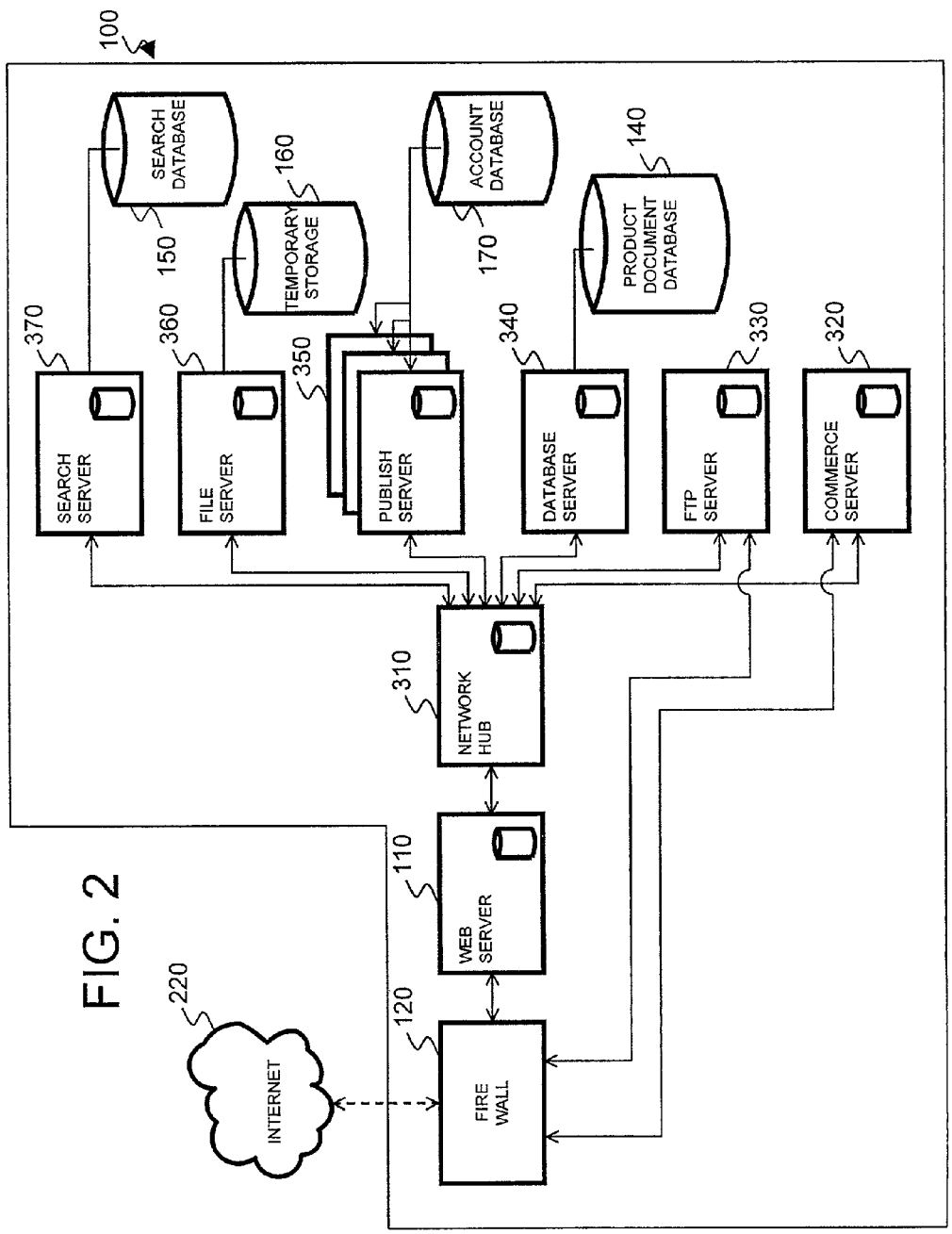
FIG. 2 is an architectural drawing illustrating a publication Web site of the present invention.

FIG. 2 is an architectural drawing illustrating publication Web site 100 of the present invention. Publication site 100 further comprises a network hub 310 linking Web server 110 to a group of publication site servers. The publication site servers include a commerce server 320 for communicating to commerce site 230, an FTP server 330 for communicating with client computer 180 using FTP protocol, a database server 340 linked to product document database 140, one or more publish servers 350 linked to account database 170, a file server 360 linked to temporary storage 160, and a search server 370 linked to search database 150. Database server 340 includes an SQL database such as ORACLE 8™, MICROSOFT SQL SERVER 7.0™, or IBM DB2™, allowing data and files to be shared between all servers in publication Web site 100.

In the descriptions of FIGS. 3 through 26, it is to be understood that either a client, or a user is linked to publication Web site 100 via their respective computers. Clients are defined as those parties wishing to publish product documents. Users are defined as those parties who wish to search the publication Web site and optionally view and/or download product documents.

Figure 3:
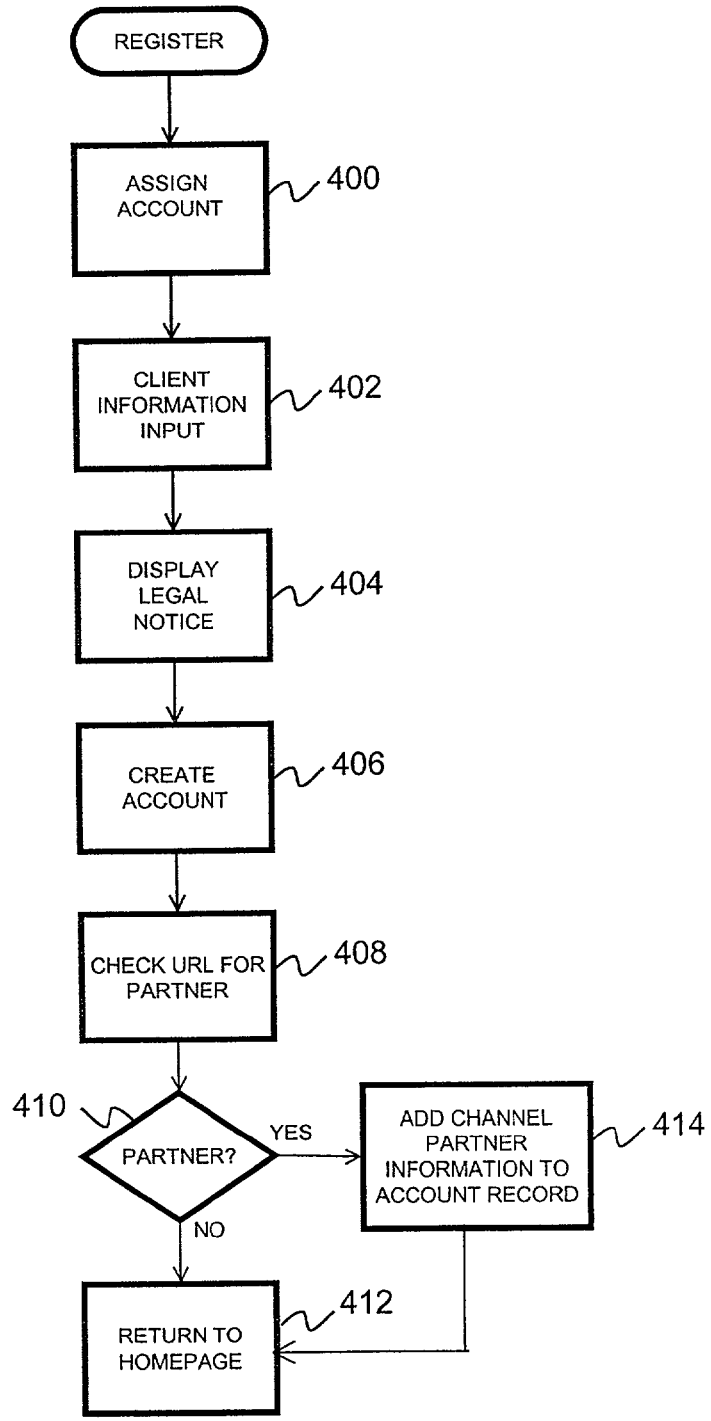
FIG. 3 is a flow diagram illustrating the method of creating a client account in the publication Web site according to the present invention.

FIG. 3 is a flow diagram illustrating the method of creating a client account in publication Web site 100, according to the present invention. Only clients are required to register. A client clicking a register link on the home page of the publication Web site displayed on client computer 180 initiates the method. In step 400, an account number is assigned to the client. In step 402, the client enters information needed to establish the account. This information includes the client name, company, title, address, and e-mail address. This is further illustrated in FIG. 30 and described below. Next, in step 404, a legal notice having conditions of use of Web site 100 is displayed. The client has a choice to accept or decline the conditions outlined in the legal notice. This is further illustrated in FIG. 31 and described below. Then, in step 406, the client's account is created. In step 408, the URL is examined to determine if the client was referred to the publication site by a channel partner via channel partner Web site 270. In step 410, if the URL indicates no channel partner referral, then the home page is displayed according to step 412. If the URL indicates a channel partner referral, the channel partner information is added to the client account in step 414 and then the home page is displayed.

Figure 4:
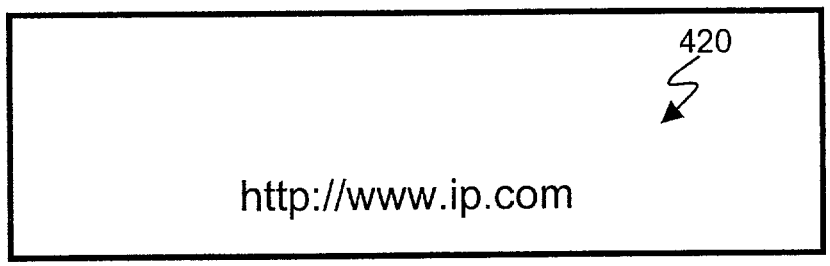
FIGS. 4 through 8 illustrate URL formats used to embed referral links within Web documents according to the present invention.
Figure 5:
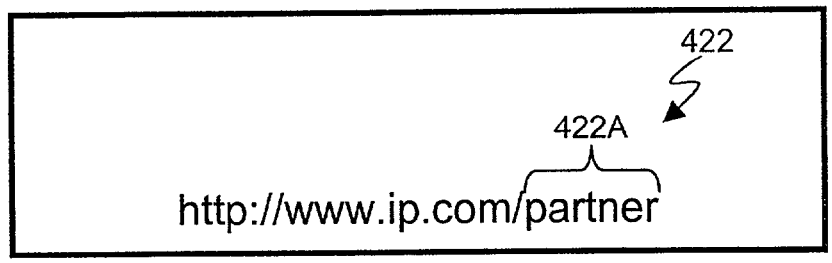
Figure 6:
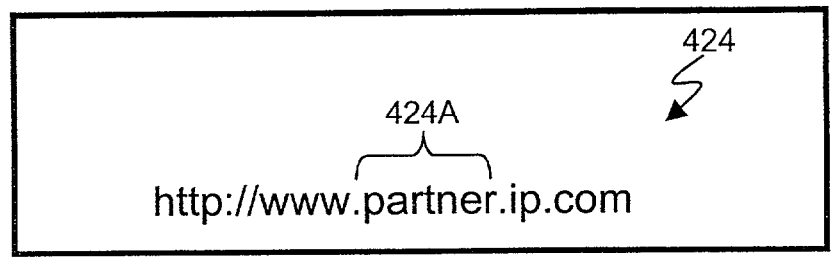
Figure 7:
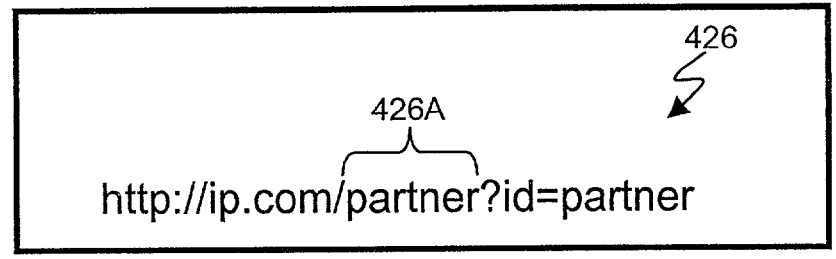
Figure 8:
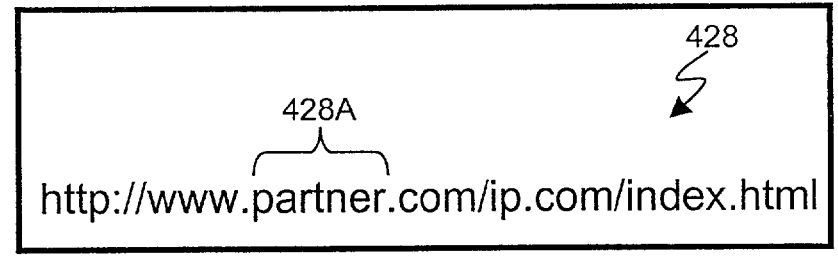

FIGS. 4 through 8 illustrate URL formats used to embed referral links within Web documents according to the present invention. Illustrated in FIG. 4 is a non-referral URL 420. Only the publication Web site address appears, in this case "ip.com," in the URL. Illustrated in FIG. 5 is a first type of referral URL 422 carrying channel partner information indicated at first type referral section 422A. Illustrated in FIG. 6 is a second type of referral URL 424 carrying channel partner information indicated at second type referral section 424A. Illustrated in FIG. 7 is a third type of referral URL 426 carrying channel partner information indicated at third type referral section 426A. Illustrated in FIG. 8 is a fourth type of referral URL 426 carrying channel partner information indicated at fourth type referral section 426A.

Figure 9:
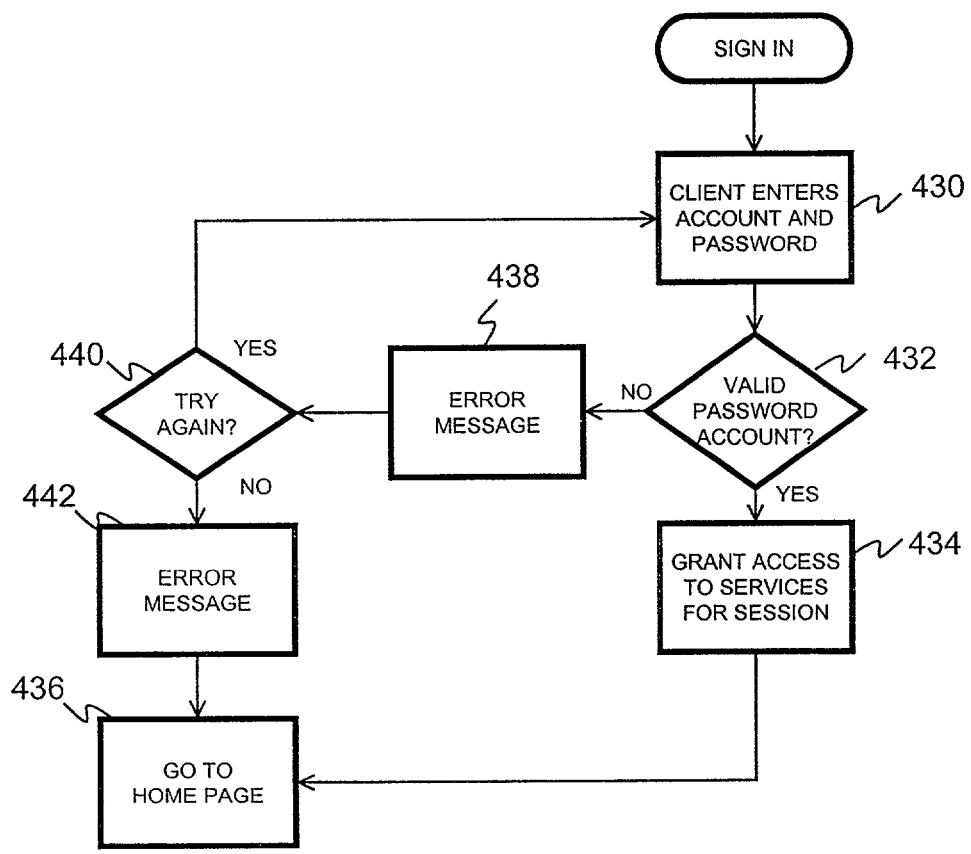
FIG. 9 is a flow diagram illustrating the method steps for a client to sign-on to the publication site according to the present invention.
Figure 29:
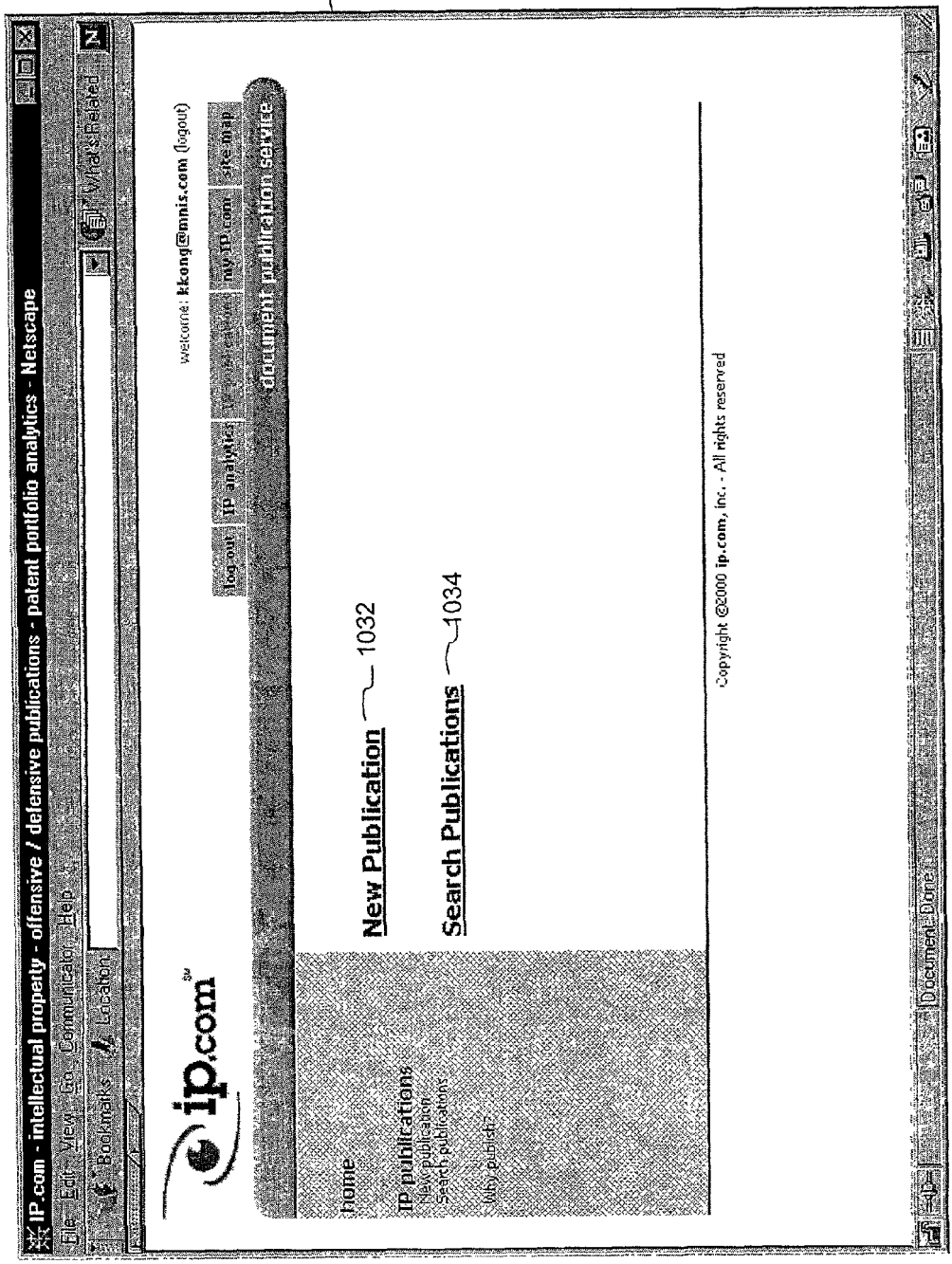
FIG. 29 is an exemplary screen display illustrating a publication Web site document publication service page, according to the present invention.

FIG. 9 is a flow diagram illustrating the method steps for a client to sign-on to the publication site according to the present invention. A client clicking a sign-on link on the home page of publication Web site 100 displayed on client computer 180 initiates the method. In step 430, the client enters his or her username and password on a sign-on screen, which is illustrated in FIG. 29 and described below. In step 432, accounts database 170 is checked for a valid username and password. If a valid username and password are found, then, in step 434, access is granted to publication Web site services for the duration of the active session and the home page of the publication Web site is displayed pursuant to step 436. If a valid username and password are not found in step 432, an error message is generated in step 438 and the client is invited to try again in step 440. If, in step 440, the user selects "try again," then the sign-on screen of step 430 is displayed again. If, in step 440, the user decides not to try again, an error message is displayed in step 442 and the home page of publication Web site 100 is displayed under step 436.

Figure 10:
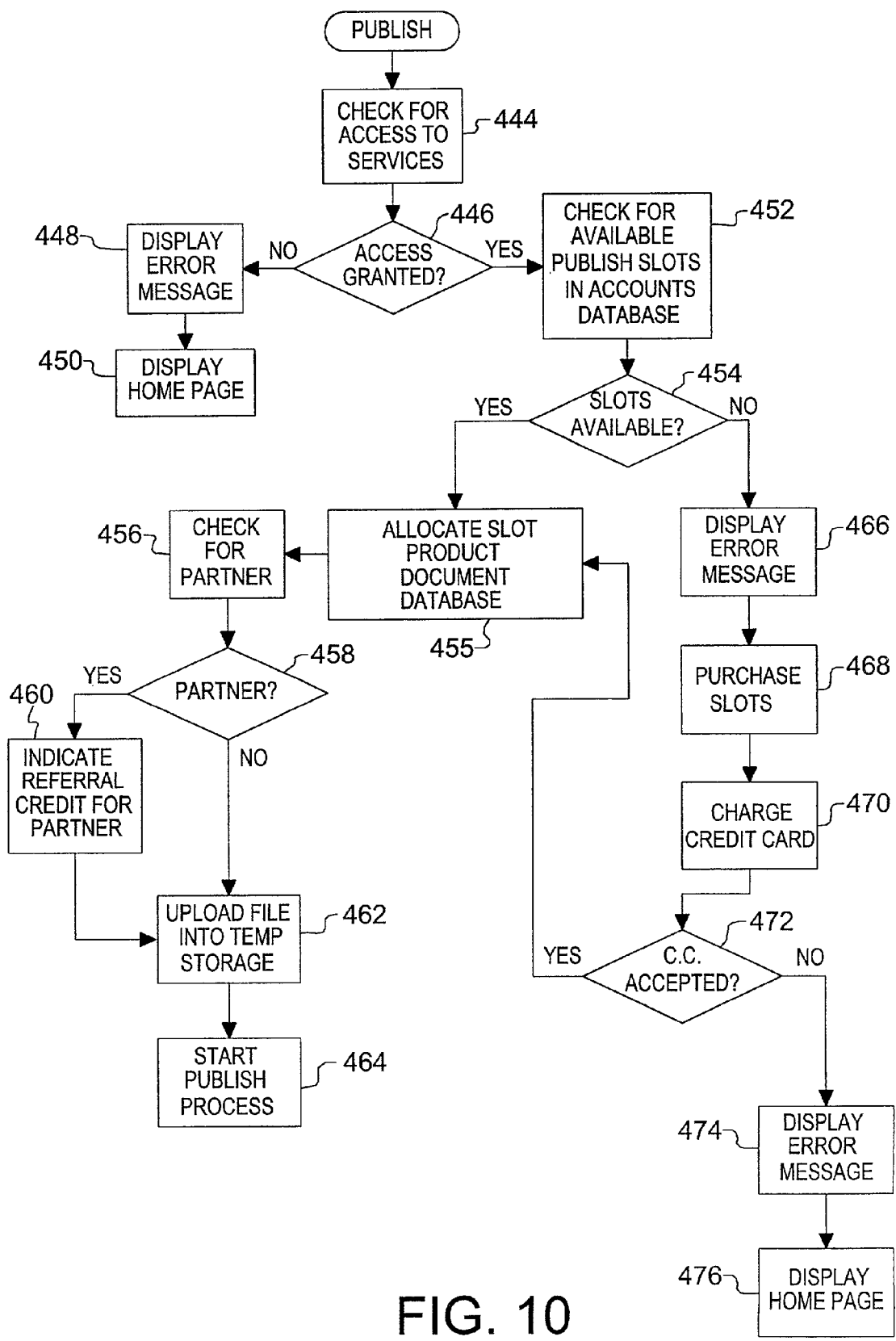
FIG. 10 is a flow diagram illustrating the method steps of uploading a product document to be published via a Global Information Network connection according to the present invention.

FIGS. 10 through 20 illustrate the publication process of the present invention. Additional descriptions of this process are illustrated in FIGS. 33 through 40 and described below. FIG. 10 is a flow diagram illustrating the method steps of uploading a product document via an Global Information Network connection for publication according to the present invention. A client clicking a publish link on the home page of publication Web site 100 displayed on client computer 180 initiates the method. In step 444, a check is performed to determine if publish access exists for the session, i.e., if a registered client is signed on and logged in. If, in step 446, access is not granted then, in step 448, an error message is displayed on client computer 180 and, in step 450, the home page of the publication Web site is displayed. However, if access is granted under step 446, then in step 452 a check is performed of accounts database 170 to determine if any publish slots are available to the client.

A publish slot is a pre-purchased reservation to upload and subsequently place a client product document in product document database 140. It should be understood, while the present invention is described with the requirement to purchase publication slots, these slots could be made available without charge to selected or all clients.

If, in step 454, it is determined that publish slots are available, then a slot is allocated in step 455. Next, in step 456, a check is made to determine if the client was a partner referral. If this is the case, step 458 branches to step 460 to indicate a referral credit for the partner in accounts database 170. Next, in step 462, the client is permitted to upload their product document to temporary storage unit 160. As part of the upload process a series of screens must be filled out. These are illustrated in FIGS. 35 through 40 and described below. If the client was not a partner referral, then step 460 is skipped and the process proceeds directly to step 464.

If no publish slots are available, then step 454 branches to step 466 and an error message is displayed. Next, in step 468, the client may purchase publish slots using a credit card charged according to step 470. The credit card is verified and charged through commerce site 230. If the credit card is accepted, the process resumes at step 455. If the credit card is not accepted, then in step 474, an error message is displayed, and in step 476, the homepage of the publication Web site is displayed.

Figure 11:
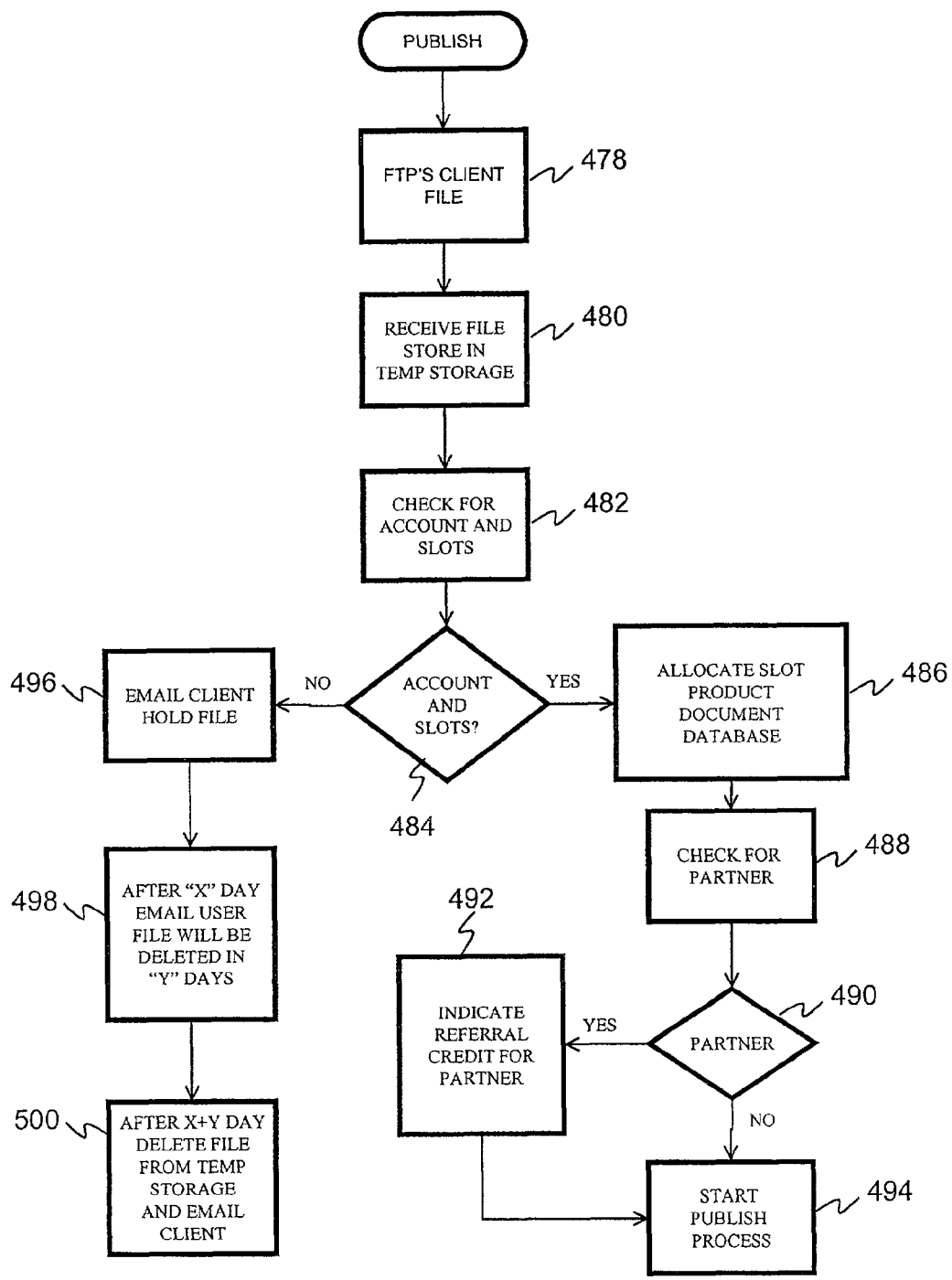
FIG. 11 is a flow diagram illustrating uploading of a product document to be published via an FTP connection according to the present invention.

FIG. 11 is a flow diagram illustrating uploading of an product document via an FTP connection to publish the document according to the present invention. This process is similar to that described above for submission via the Global Information Network, except that account information and passwords must be transmitted along with the product documents themselves. In step 478, the client, using client computer 180, transmits the electronic product document file(s) to publication Web site 100 using FTP. Pursuant to step 480, the document file(s) are received by publication Web site 100 and placed in temporary storage unit 160. Next, in step 482, a check is performed to determine if the document file(s) are from a registered client and if publish slots are available for the client. If, in step 484, it is determined that the client has a valid account and publish slots are available, then in step 486, a slot is allocated. Next, in step 488, a check is made to determine if the client was a partner referral. If so, then step 490 branches to step 492 and a referral credit for the partner is indicated in accounts database 170. The publication process is then started in step 494. If the client was not a partner referral, then step 492 is skipped and the process proceeds directly to step 494.

If the account is invalid or no publish slots are available then step 484 branches to step 496, whereby an e-mail message is sent to the client informing the client of the problem and how remedy the problem. If no response is received from the client after a predetermined "X" number of days, then in step 498, a second e-mail message is sent to the client informing the client that in a predetermined "Y" number of days, the uploaded product document file(s) will be expunged from publication Web site 100, that is, deleted from temporary storage unit 160. Finally, in step 500, if no response is forthcoming from the client, the client's product document file(s) are deleted from temporary storage unit 160 and the client is informed by e-mail.

Figure 12:
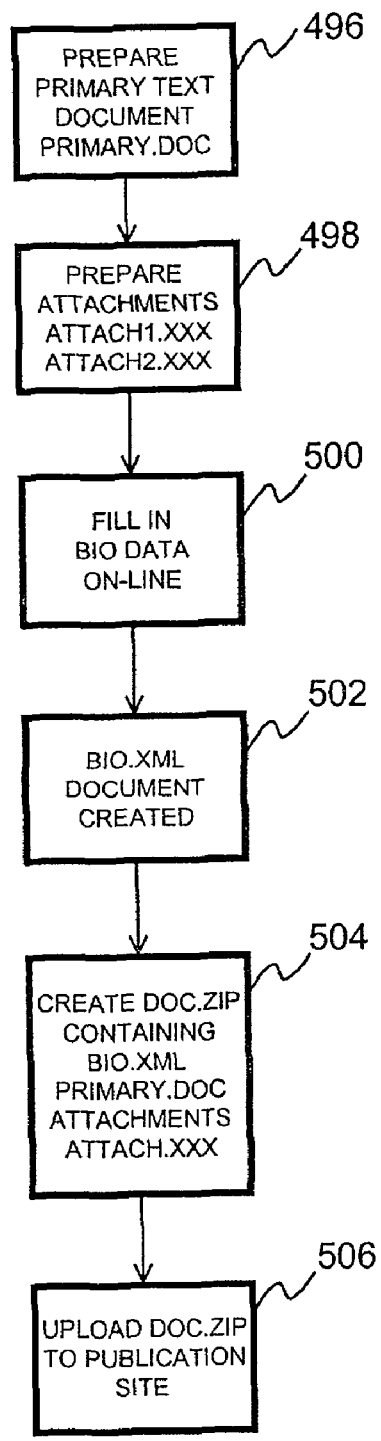
FIG. 12 is a flow diagram illustrating client preparation and upload of a product document to be published according to the present invention.

FIG. 12 is a flow diagram illustrating client preparation and upload of a product document to be published according to the present invention. In step 496, the client prepares a primary product document file (primary.doc). This usually is a text document. In step 98, the client prepares one or more attachment files (attach.xxx). The attachments can include both text and non-text files, such as for example text files of sample deposition statements, image files of brochures, purchase orders, sales invoices, commercial Web site pages, printed advertisements, and drawings, video clip files of advertisements and the like, and audio clip files of advertisements and the like. In step 500 the client fills in the bibliographic material online from client computer 180, and, in step 502, a bibliographic data file (bio.xml) is created. File type XML is preferred. The bibliographic data file comprises a document owner, a document title, an abstract of the document, names of persons affiliated with the document with e-mail, phone and a description of their relationship to the document, any client copyright information, a date the subject product was first made commercially available (on sale) in the United States, a publication country, a publication language, a list of related documents and an anonymous key. If the anonymous key is set to full, all authorship information is included with the published product document. If the anonymous key is set to anonymous, all authorship material will not be included with the published product document. In step 504, a compressed product document file (doc.zip), containing the primary document file, attachment file(s), and the bibliographic data file is created by publication Web site 100. Finally, in step 506, the client, using client computer 180, uploads the compressed product document file. In the case of the client using FTP to upload the files to publication Web site 100, the bibliographic and compressed product document files will need to be prepared by the client, and then transmitted to publication Web site 100 via client computer 180.

Figure 13:
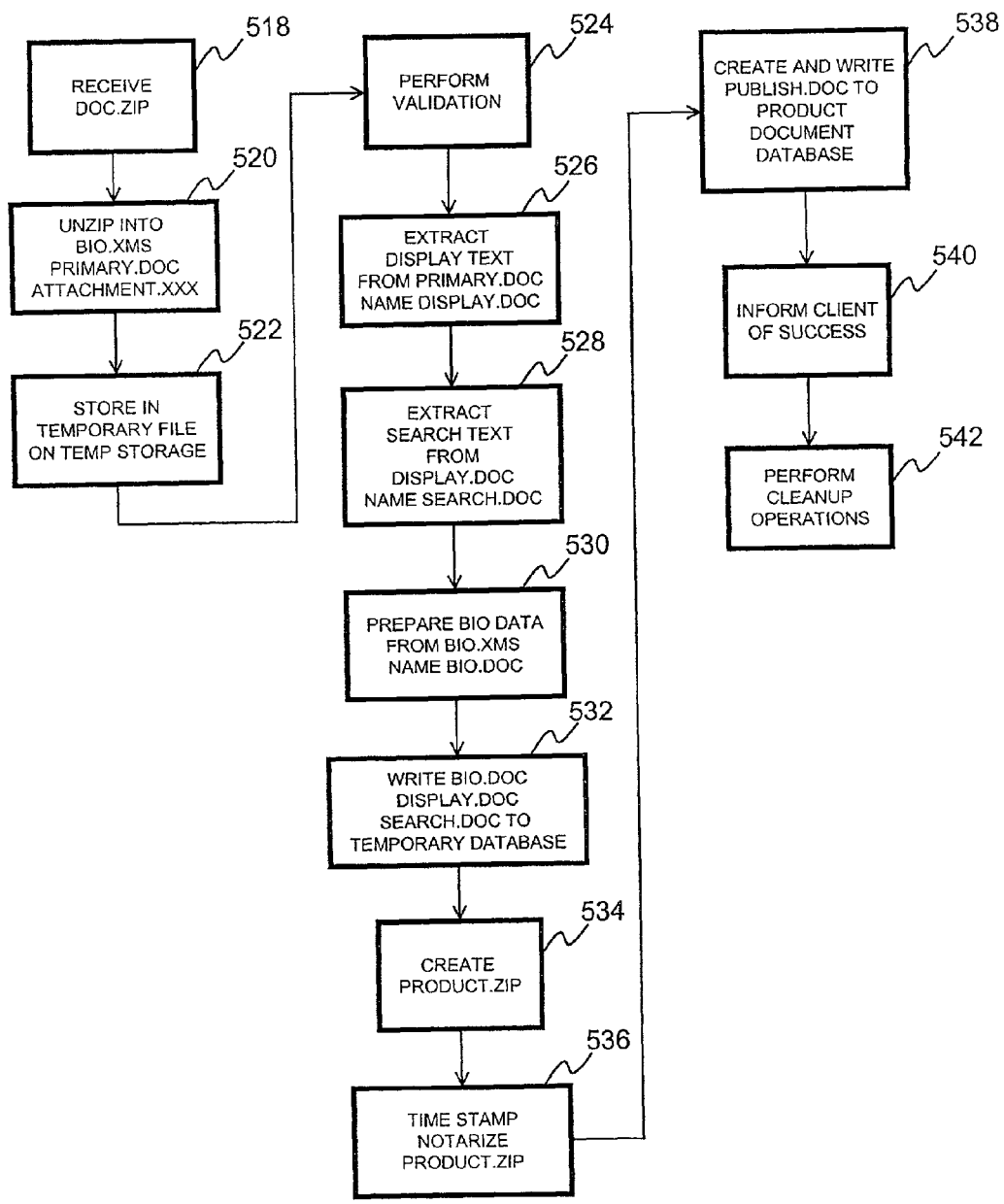
FIG. 13 is a flow diagram illustrating the method steps of receiving and publishing a product document on the publication site according to the present invention.
Figure 14:
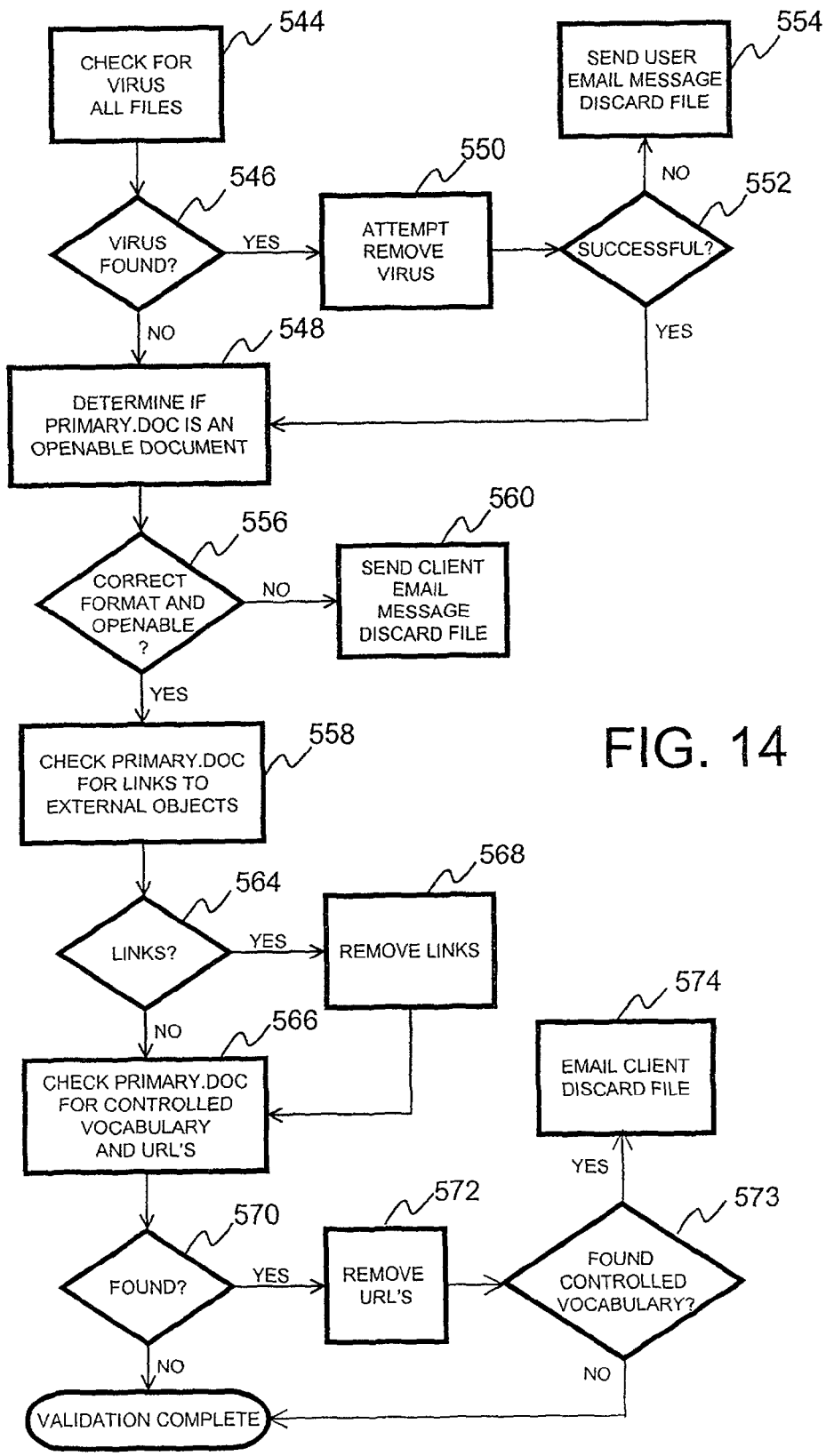
FIG. 14 is a flow diagram illustrating the step of FIG. 13 of validation of the uploaded product document, according to the present invention.
Figure 15:
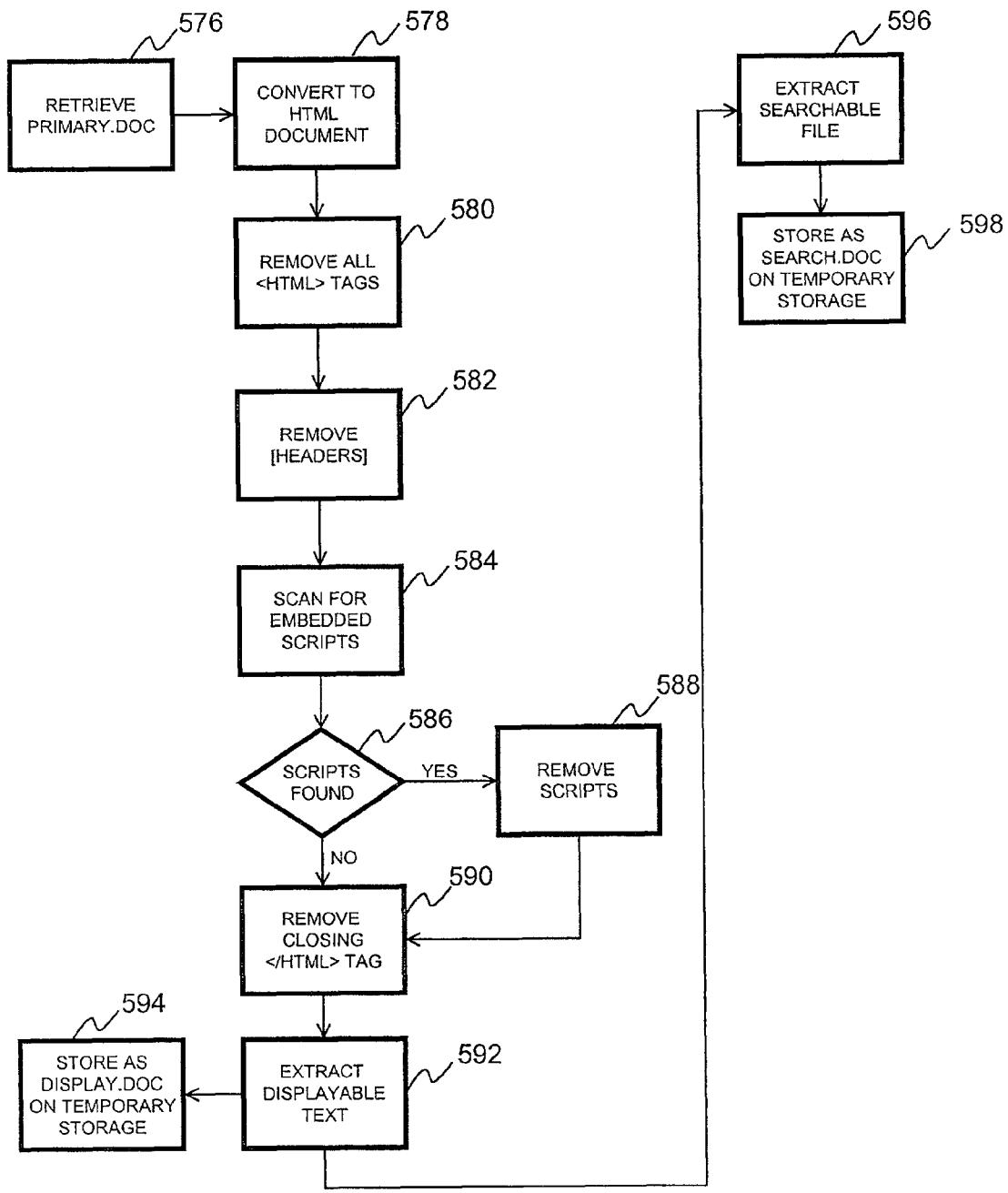
FIG. 15 is a flow diagram illustrating the steps of FIG. 13 of extraction of the uploaded product document and creation of a searchable document, according to the present invention.
Figures 16, 17:
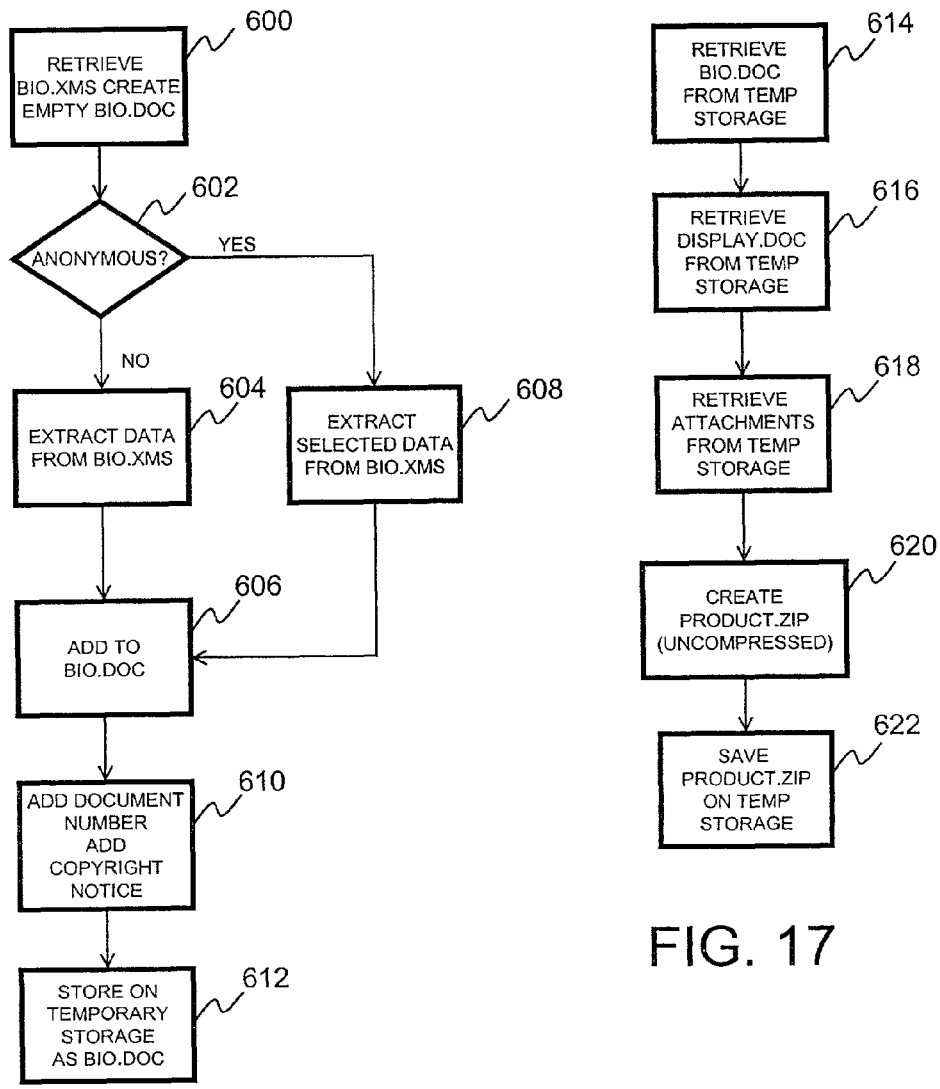
FIG. 16 is a flow diagram illustrating the step of FIG. 13 of preparation of a bibliographic data file, according to the present invention.
FIG. 17 is a flow diagram illustrating the step of FIG. 13 of creating a product document file, according to the present invention.
Figure 18:
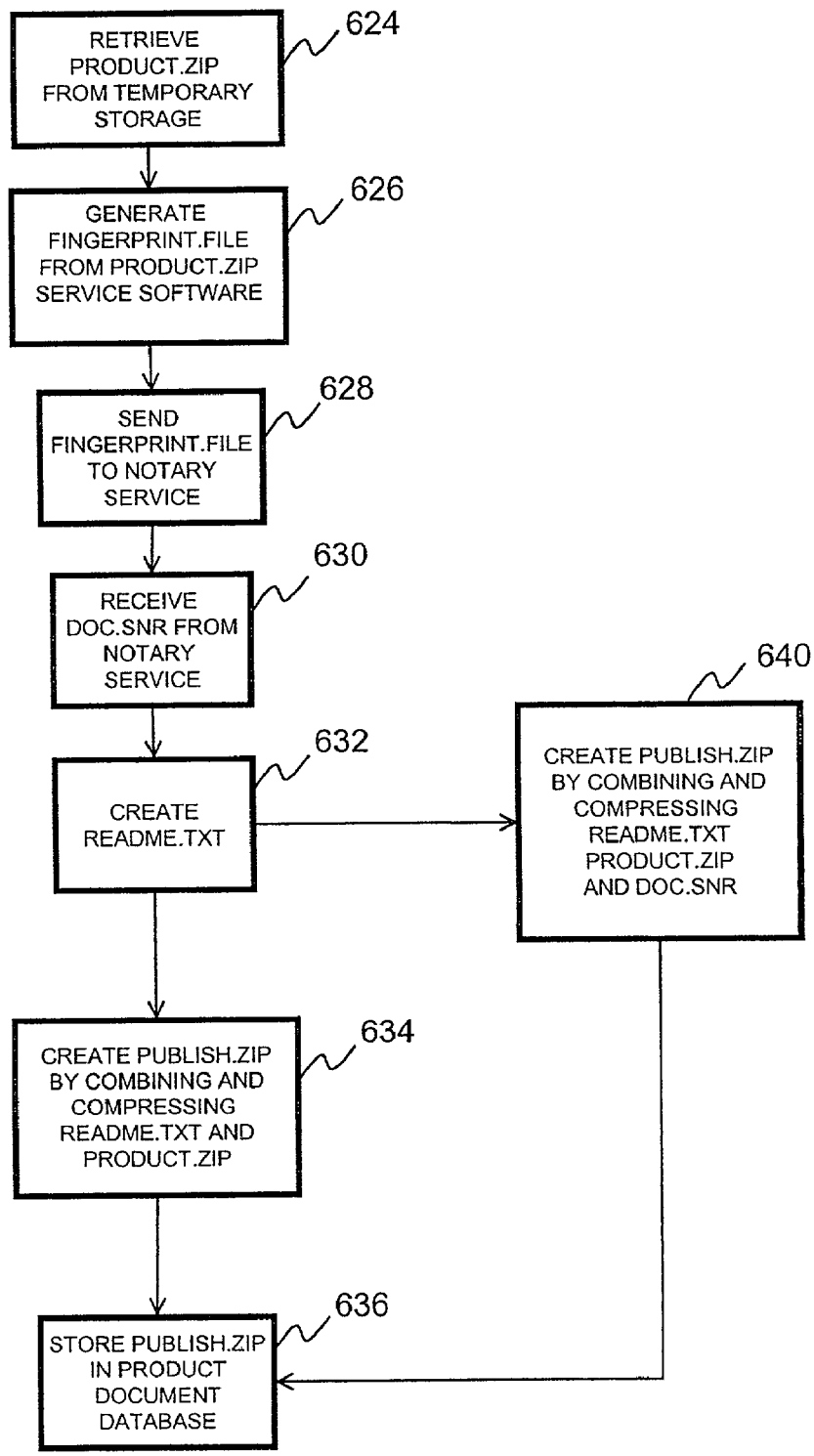
FIG. 18 is a flow diagram illustrating the step of FIG. 13 of notarization of the product document file, according to the present invention.

FIG. 13 is a flow diagram illustrating the method steps of receiving and publishing a product document according to the present invention. In step 518, the compressed product document file is received from client computer 180 by publication Web site 100. In step 520, the compressed product document file is de-compressed and reformed into the bibliographic data file, the primary text document file, and the attachment file(s). In step 522, the bibliographic data file, the primary text document file, and the attachment file(s) are placed in temporary storage unit 160. In step 524, a validation is performed. The validation process is illustrated in FIG. 14, and described below. In step 526, the text that will be displayed when a user views the product document is extracted from the primary document into a display document file (display.doc). The display document file comprises HTML fragments for display. Tables are kept in table format, lists in list format, and indentations are preserved. In step, 528, search text is extracted from the display document file into a search document file (search.doc). The search document file comprises text in the form of sentences. Cells in tables are converted to sentences, and formatting is removed from ordered lists. The search document file is accessed when a user wants to search for documents on publication Web site 100. Of course, it is possible to search the display document file or the primary document file directly, but using a specially organized search document file with pointers to the display document file is more efficient. The extraction and creation the display and search document files is illustrated in FIG. 15 and described below. In step 530, a bibliographic document (bio.doc) is created from the bibliographic data file. This process is illustrated in FIG. 16, and described below. In step 532, the bibliographic document file, the search document file, and the display document file are written to temporary storage unit 160. In step 534, an un-compressed product document file (product.zip) containing the bibliographic document file, the display document file, and the attachment files is created. Next, in step 536, the compressed product document file is notarized and time-stamped. A notary file (doc.snr) is returned from the notarization vender. The notarization process is illustrated in FIG. 18, and described below. According to step 538, the compressed product document file, a read-me document file (readme.txt) and optionally the notary file are compressed into a product document file (publish.zip) and written to product document database 140. If the notary file is not included in the product document file, then the read-me file will contain information on how to obtain it. Next, in step 540, the user is informed of successful publication and in step 542, cleanup operations are performed.

FIG. 14 is a flow diagram illustrating in greater detail step 524 of FIG. 13 of validation of the uploaded product document, according to the present invention. In step 544, a check is performed for viruses in the uploaded file. If the check is determined to be negative then step 546 branches to step 548, and it is determined if the primary product document file is an open-able file. If a virus was found, then step 546 branches to step 550 and attempt to remove the virus is performed. If the attempt was successful, process is directed by step 552 to continue at step 548; if not, the client is informed of the virus by e-mail and the file is discarded according to step 554. If the file is determined to be open-able, then step 556 proceeds to step 558 and the file is opened and checked for links to external objects. If, however, the file is not open-able, then step 556 proceeds to step 560, whereby the client is informed of the problem by e-mail and the file is discarded. If no links are found in step 558, then step 564 directs flow to step 566 and the file is checked for controlled vocabulary and URLs. Controlled vocabulary includes words that are deemed offensive or improper to an invention publication. If links are found in step 558, then step 564 directs flow to step 568 to remove the links before proceeding to step 566. If no controlled vocabulary or URLs are found, then validation is complete and step 570 branches out of the validation process. If URLs are found, then step 570 branches to step 572 to remove the URLs before proceeding to step 573. If controlled vocabulary is found, the client is informed of the situation by e-mail and the file is discarded pursuant to step 574; otherwise, validation is complete.

FIG. 15 is a flow diagram illustrating steps 526 and 528 of FIG. 13 for extraction of the uploaded product document and creation of a searchable document, according to the present invention. In step 576, the primary product document file is retrieved from temporary storage unit 160 and, in step 578, is converted to an HTML document. In step 580, all HTML tags are removed, and in step 584 all "headers" are removed. Next, in step 584, the document is scanned for embedded scripts. If scripts are found, then step 586 directs flow to step 588 to remove the scripts before flow proceeds to step 590; otherwise, if no scripts are found, flow passes directly to step 590. In step 590, closing HTML tags are removed. Next, in step 592, the displayable text is extracted and, in step 594, written to the display document file as previously discussed. Then, in step 596, the searchable text is extracted and, in step 598, written to the search document file as previously discussed.

FIG. 16 is a flow diagram illustrating step 530 of FIG. 13 for preparation of a bibliographic document file, according to the present invention. In step 600, the bibliographic data file is retrieved from temporary storage unit 160 and an empty bibliographic document file is created. If the anonymous key is set to full, step 602 directs flow to step 604, whereby the document owner, the document title, the abstract of the document, the names of persons affiliated with the document and their relationship to the document, any client copyright information, the on sale date, the publication country, the publication language, and the list of related documents are extracted from the bibliographic data file and, in step 606, added to the bibliographic document file. If, however, the anonymous key is set to anonymous, then step 602 directs flow to step 608 so that only selected bibliographic material is extracted from the bibliographic data file. This includes the document owner, the document title, the abstract of the document, the on sale date, the publication country, the publication language, and the list of related documents. Then, in step 606, the selected bibliographic material is added to the bibliographic document file. In step 610, a document number and a copyright notice are added to the bibliographic document file. Finally, in step 612, the bibliographic document file is written to temporary storage unit 160.

FIG. 17 is a flow diagram illustrating step 534 of FIG. 13 for creation of a product document file pursuant to the present invention. In step 614, the bibliographic document file is retrieved from temporary storage unit 160. In step 616, the display document file is retrieved from temporary storage unit 160. In step 618, the attachment file(s) are retrieved from temporary storage unit 160. Next, according to step 620, the bibliographic document file, the display document file, and the attachment file(s) are combined into the un-compressed product document file. Then, in step 622, the un-compressed product document file is written to temporary storage unit 160.

FIG. 18 is a flow diagram illustrating step 536 of FIG. 13 of notarization of the product document file, according to the present invention. In step 624, the un-compressed product document file is retrieved from temporary storage unit 160. Then, in step 626, the product document file is used to create a fingerprint file (fingerprint.file). This is accomplished using software supplied by the notarization vender. Two such notarization venders are Surety.com and First Use.com. Next, in step 628, the fingerprint file is electronically sent to the notarization vender, and in step 630, a notary file is received by publication Web site 100. In step 632 a read-me document file is created. The next step 634 involves combining and then compressing the read-me document file ("readme.txt") with the un-compressed product document file ("product.zip") to create a compressed product document file ("publish.zip"). Then, in step 636, the compressed product document file is written to product document database 140. Step 640 is an optional replacement step for step 634. In step 640, the read-me document file, the un-compressed product document file, and the notary file are combined and then compressed to create the compressed product document file. One more series of events must occur before the document may be considered published, as illustrated in FIG. 19, and described below.

Figure 19:
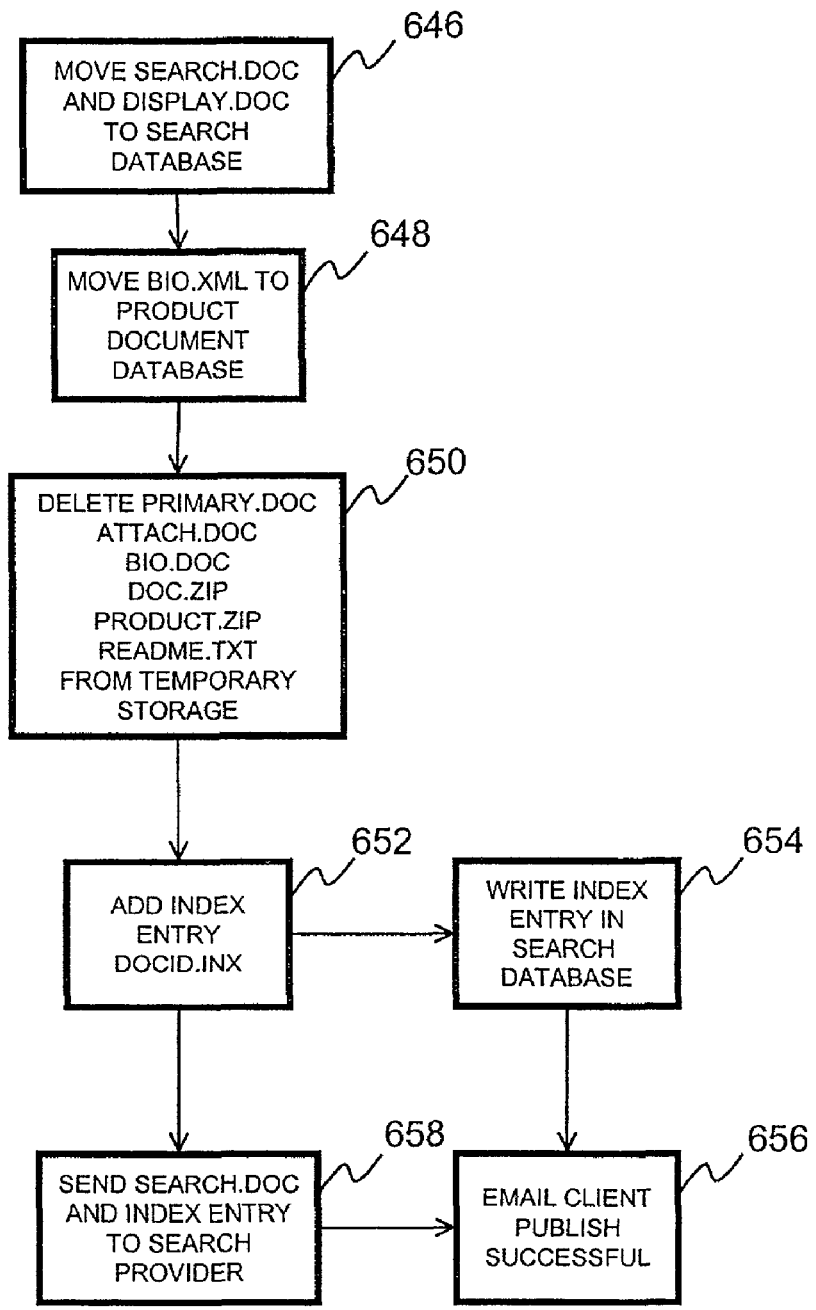
FIG. 19 is a flow diagram illustrating the steps of FIG. 13 of activating the product document, according to the present invention.

FIG. 19 is a flow diagram illustrating step 538 of FIG. 13 of activating the product document, according to the present invention. In step 646, the search document file and the display document file are moved from temporary storage unit 160 to search database 150. In step 648, the bibliographic file is moved from temporary storage unit 160 to search database 150. In step 650, the compressed product document file (uploaded by the client), the primary product document file, the attachment file(s), the bibliographic document file, and the un-compressed product document file are deleted from temporary storage unit 160. In step 652, an index entry of the document number is added to an index file (docid.inx) on search database 160. The index file links search document files to the corresponding compressed product document files. Then in step 656, the client is notified, preferably by e-mail that the product document has been published. Step 658 may be performed in addition to step 654 or as an alternative to step 654. In step 658, the search document file and the index entry are electronically sent to a search provider. The search site may be a Global Information Network based Web site or an in-house user/subscriber.

Figure 20:
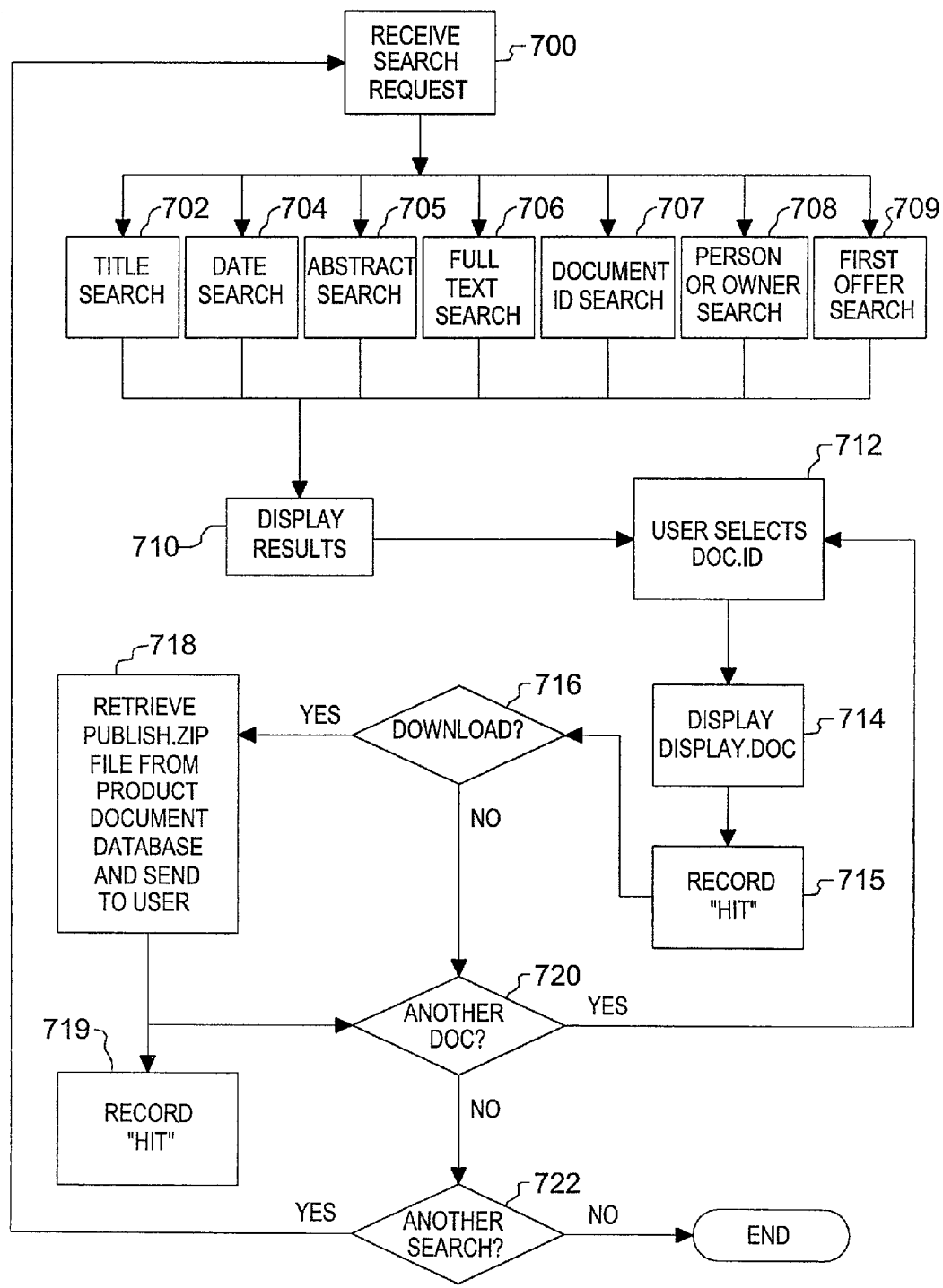
FIG. 20 is a flow diagram illustrating the method steps of searching the product document database, according to the present invention.

FIG. 20 is a flow diagram illustrating the method steps of searching the product document database, according to the present invention. In step 700, publication Web site 100 receives a search request containing text to be searched and search criteria from a user's computer. Seven types of searches may be performed depending upon the search criteria selected by the user. In step 702, the search text is searched across all titles of product documents in search database 150. In step 704, the search text is searched across all dates of publication (or range) of product documents in search database 150. In step 705, the search text is searched across all abstracts of product documents in search database 150. In step 706, the search text is searched across the full text of product documents in search database 150. In step 707, the search text is searched across all product document numbers of documents in search database 150. In step 708, the search text is searched across all persons affiliated with or owners of product documents in search database 150. Finally, in step 709, the search text is searched across all dates of first offer for sale (or range) of product documents in search database 150. Moving now to step 710, the product document number (as a hyperlink), publication date, title, and abstract of matching documents are displayed on the user's computer. In step 712, the user selects the link to a product document and, in step 714, the display document is displayed on the user's computer. According to step 715, a record is made of a "hit" against the product document. A hit is simply a record that a user has selected the document for viewing. The record may be stored in either the accounts database 170, or in the product document database 140. No other information is collected, and the user remains anonymous. Next, in step 716, the user may elect to download the product document. If the user elects to download the product document then, in step 718, the product document is retrieved from product document database 140 and copy is electronically sent to the user's computer and, in step 719, a record is made of a "download" against the document. Again, no other information is collected, and the user remains anonymous. Again, the record may be stored in either accounts database 170, or in product document database 140. "Hit" and "download" records are collected as an indication of the availability of the document to the public. "Hit" and "download" records may be time/date stamped. Then, in step 720, the user may select another product document to display, thereby returning program flow to step 712. If the user decides not to download the displayed product document in step 716, the user may still choose, in step 720, to select another product document to display by returning to step 712. If, in step 720, the user chooses not to display another product document, then in step 722 the user may choose to perform another search. If the user elects to perform another search, the process returns to step 700. Otherwise, the search session is ended.

Figures 20A, 20B:
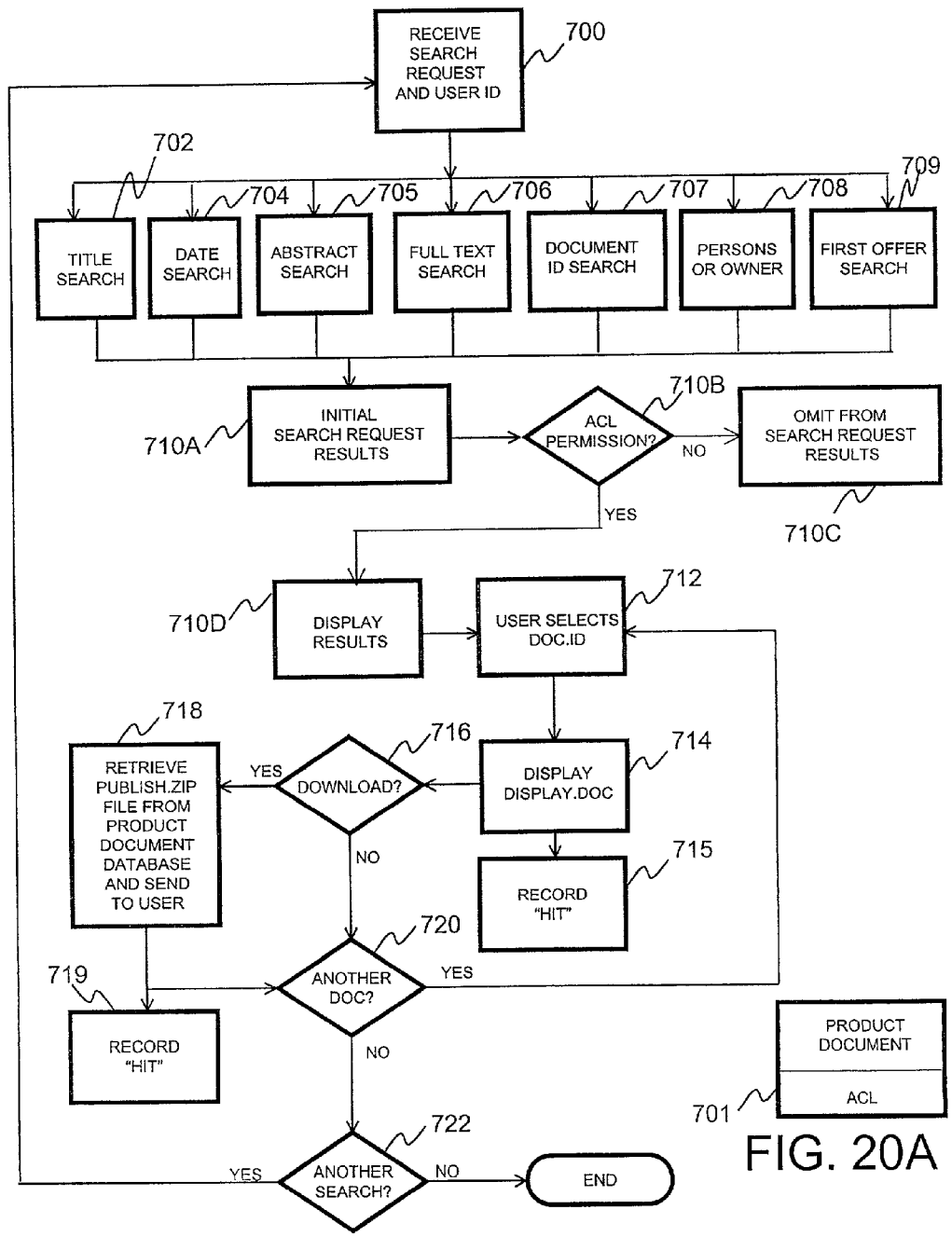
FIG. 20A is a schematic depiction of a product document file showing an Access Control List associated with the product document in accordance with a refinement of the present invention.
FIG. 20B is a flow diagram similar to that of FIG. 20, however showing method steps associated with the use of an Access Control List for restricting user access to product documents.

FIGS. 20A and 20B achematically show a refinement of the present invention whereby a client can enable selected users or user groups to access or locate a particular product document and prevent other users from accessing or locating the same product document. For example, a client may wish to make a product document available as prior art to Patent Offices of various countries throughout the world, without making the product document available to competitors, potential competitors, consumers, news media, etc. According to the refinement, an Access Control List (ACL) 701 is associated with each product document as indicated in FIG. 20A, and a user must log-in prior to searching. The ACL has an entry for each user or user group having access privileges to the associated product document. When the user enters search criteria as described above, a query is formulated and executed against product documents in search database 150, however the query further requires that the user have access privileges in accordance with the ACL associated with the product document. Consequently, even if one or more matching product documents would be found using a particular set of search criteria, only those product documents granting access to the user are retrieved and displayed. By default, a product document has no ACL and access is net restricted.

FIG. 20B is similar to FIG. 20, but differs in certain respects related to the use of an ACL. First, in step 700, a user identification is received along with the search request entered by the user. This enables the user identification to be checked against the ACL 701 of each product document in search database 150. Thus, the product documents in an initial set of matching product documents generated in accordance with step 710A must also grant permission in their respective ACLs to the identified user in accordance with step 710B before they are displayed at step 710D. If a product document's ACL does not grant permission to the identified user, then the product document is omitted from the search results displayed at step 710D. Of course, in actual practice, the user identification is simply another search criterion that is used to formulate the search query, and the sequential "weeding out" of restricted product documents from an initial set of search results as described above is a simplification used for the sake of explanation.

The ACL can be established by the client as part of the method of preparing and uploading a product document as described above with respect to FIG. 12. For example, the client can be prompted to select for one or more users or user groups from a predefined list of users and user groups, and the ACL can then be created based on the client's response to the input prompt. User groups preferably included in the predefined list include national and regional Patent Offices throughout the world.

It will be realized by those skilled in the art that the access restriction function of an ACL can be accomplished by other means. For example, by the use of flag fields associated with each product document record in search database 150, or by the use of a specially generated search database that contains only product documents to which the identified user has access permission.

Figure 21:
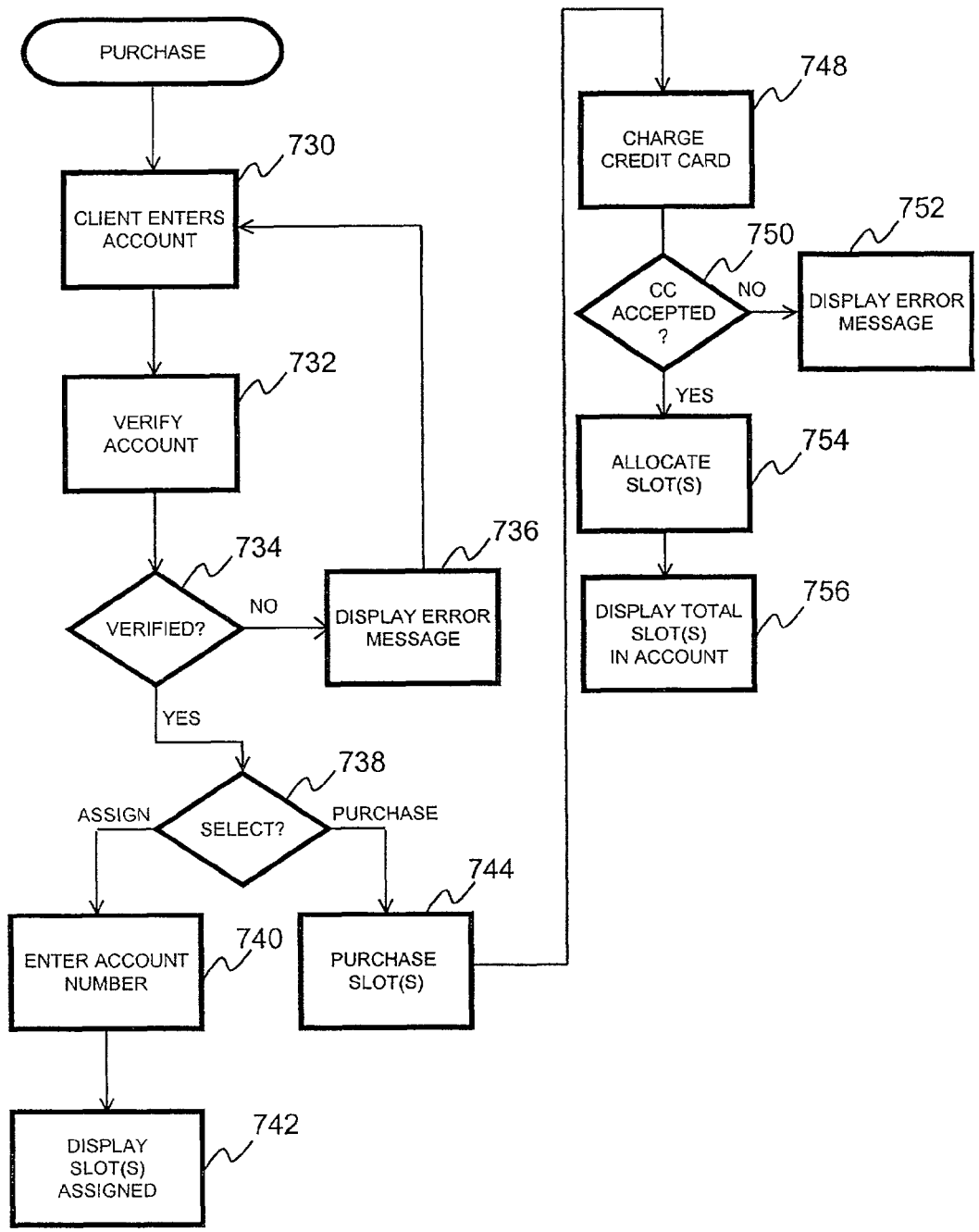
FIG. 21 is a flow diagram illustrating the method steps of purchasing publication slots, according to the present invention.

FIG. 21 is a flow diagram illustrating the method steps of purchasing publication slots in accordance with the present invention. In step 730, the client enters his or her account information (generally account number/name and password) using client computer 180 after linking to publication Web site 100. In step 732, the account information is verified by checking the information entered against the accounts listed in accounts database 170. If the account information does not match an existing account, then step 734 branches to step 736 and an error message is displayed on client computer 180. Flow then reverts to step 730 and the client is prompted to register or re-enter account information. If the account information is verified as an existing account, step 734 branches to step 738, wherein the client has the choice to either reassign a publication slot(s) to another registered user or purchase an additional slot(s). If, in step 738, the client chooses to reassign publication slots, then in step 740, the user enters the account number/name of the account to receive the publication slot(s). Next, in step 742, the number and accounts of the slot reassignment are displayed on client computer 180. If the client chooses, in step 738, to purchase an additional publication slot(s), then in step 744, the client is requested to enter a credit card number and commerce site 230 is contacted in step 748. If the credit card number is not accepted in step 750, then an error message is displayed on client computer 180 under step 752. If the credit card number is accepted in step 750, then additional slots are allocated under step 754 and the total number of slots available to the account is displayed on client computer 180 under step 756.

Figure 22:
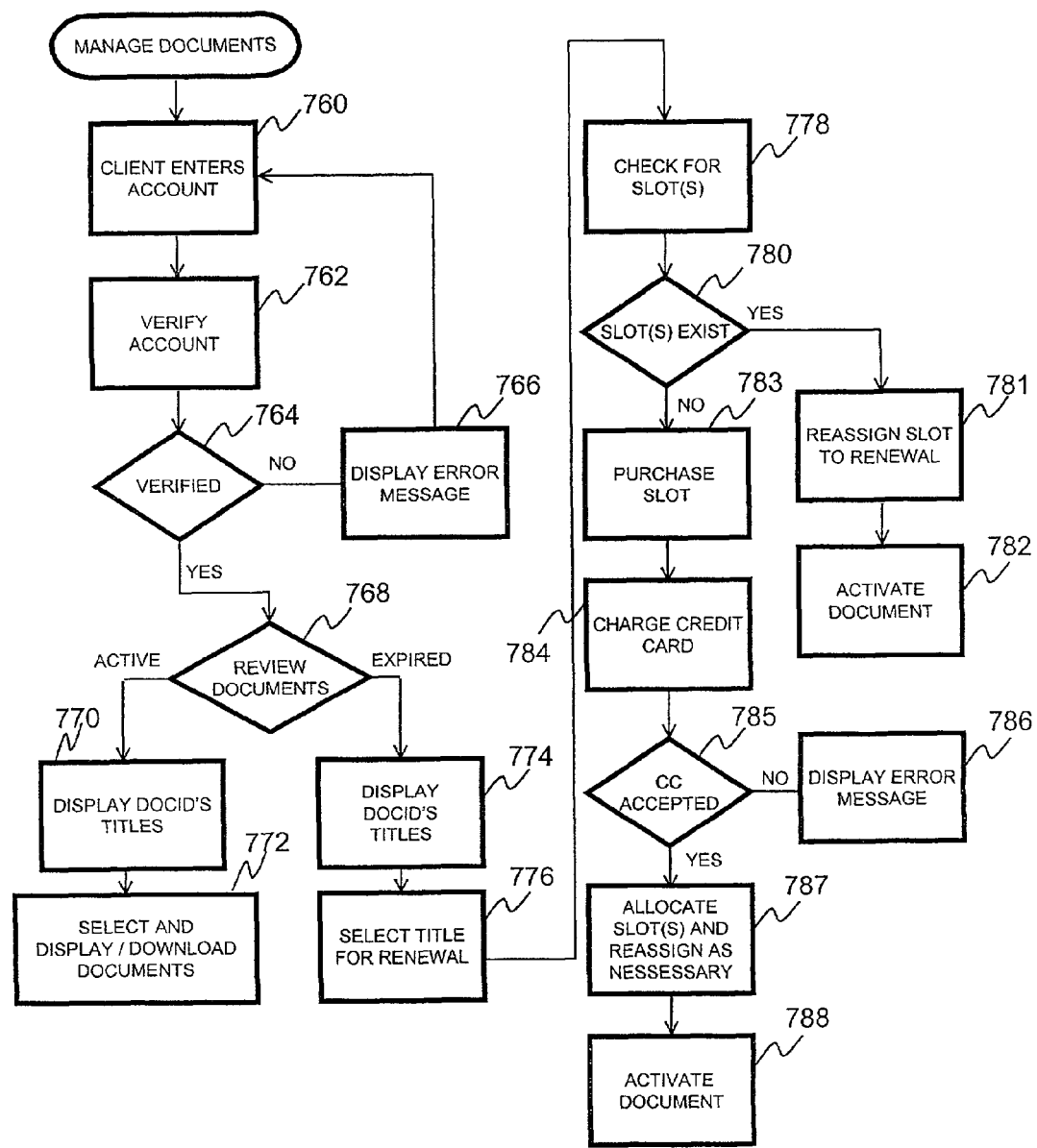
FIG. 22 is a flow diagram illustrating the optional steps of a method of client management of product documents on the publication site searchable database, according to the present invention.

FIG. 22 is a flow diagram illustrating the optional steps of the method of client management of product documents on the publication site searchable database, according to the present invention. In step 760, the client enters account information (generally account number/name and password) using client computer 180 after linking to publication Web site 100. In step 762, the account information is verified by checking the information entered against the accounts listed in accounts database 170. If the account information does not match an existing account, step 764 routes program flow to step 766 to display an error message on client computer 180 and the client is prompted to register or re-enter his or her account information by return to step 760. If the account information is verified as an existing account, step 764 routes program flow to step 768 and the client has the choice to either review active product documents or expired product documents.

An expired product document is a product document disabled in search database 150. A process of renewing expired publications is used only for product documents placed on product document database 140 under an agreement for a fixed term. Product documents are normally placed in product document database 100 for an indeterminate term with no fixed expiration date.

If, in step 768, the client chooses to review active documents, then a list of active product document numbers registered with the account is displayed according to step 770. Then, in step 772, the client may select a product document for display or download. If, in step 768, the client chooses to review expired documents, then a list of expired product document numbers registered with the account is displayed according to step 774. Step 776 involves prompting the client to select a product document for renewal. Next, in step 778, a check for a publication slot available to the account is performed. If a publication slot exists, then step 780 branches to step 781, whereby the slot is reassigned to renew. Finally, in step 782, the previously expired product document is activated.

Returning to step 780, if no publish slot is available, then the client may purchase a publish slot in step 783 by charging a credit card in step 784. Fees for renewal may differ from fees for the initial publication. The credit card is verified and charged through commerce site 230. If, in step 785, the credit card is accepted then, in step 787, a publication slot is allocated and in step 788, the expired document is activated. Enabling the product document in search database 150 activates the expired product document. If, in step 785, the credit card is not accepted, then in step 786, an error message is displayed on client computer 180.

Figure 23:
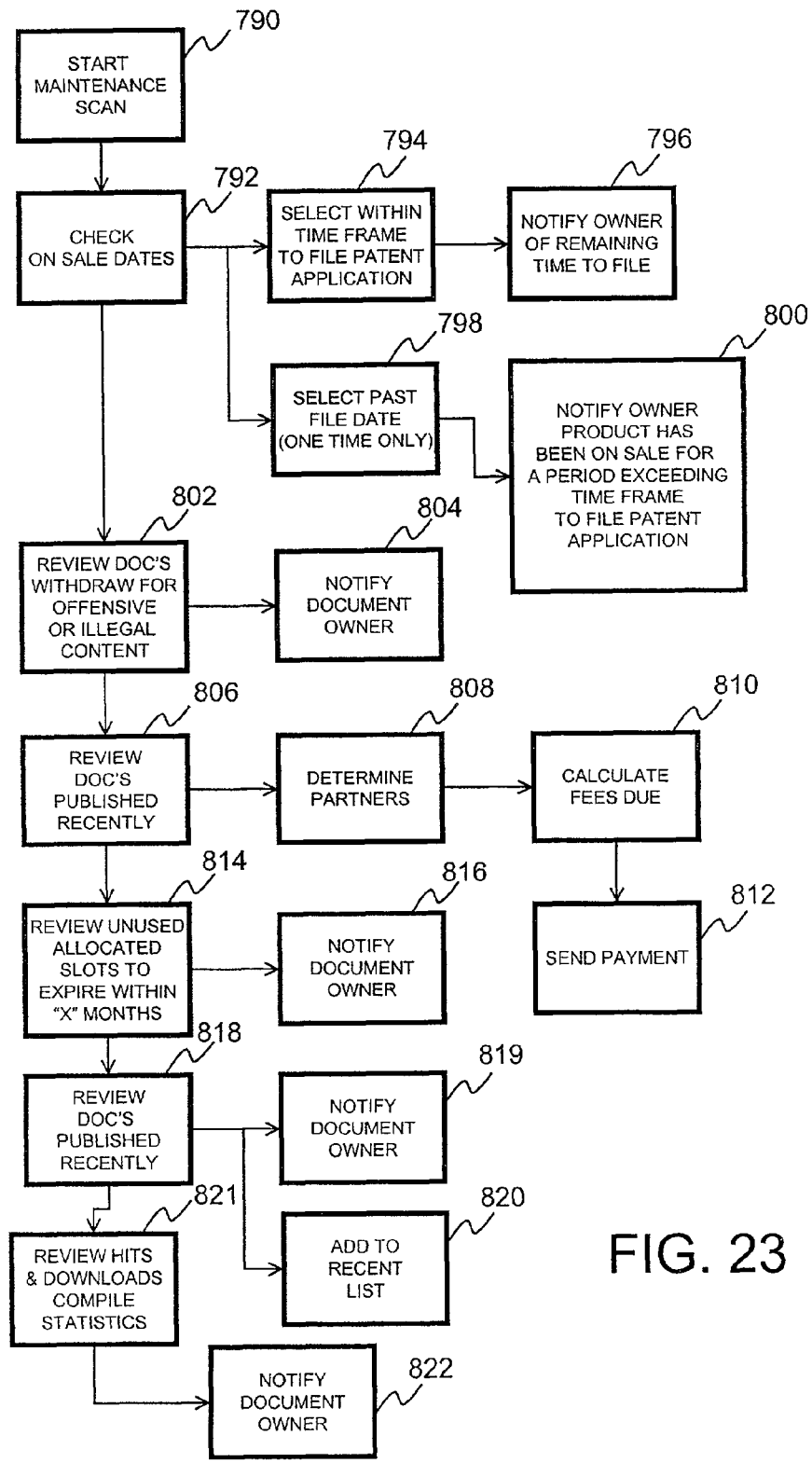
FIG. 23 is a flow diagram illustrating the method steps of maintenance and accounting routines, according to the present invention.

FIG. 23 is a flow diagram illustrating the method steps of maintenance and accounting routines, according to the present invention. In step 790, a maintenance scan is started. Maintenance scans are performed to a preset schedule to perform such functions as, but not limited to, checking the age of product documents, determining fees due, if any, to channel partners, reviewing cases of inappropriate content, and compiling statistics. In step 792, the "on sale" dates associated with product documents on product document database 140 are checked. Then, in step 794, those product documents which have not been on sale for longer than the statutory time limit to file a patent application in the United States are selected and, in step 796, the product document owner(s) are notified of the time remaining to file a U.S. patent application. In step 798, those product documents relating to products which have been on sale for longer than the statutory time limit to file a patent application in the United States are selected. In step 800, the product document owner(s) are notified that the deadline to file a patent application has passed.

Next, in step 802, product documents that have been withdrawn (made non-searchable) since the last scan (e.g. for offensive or inappropriate content) are selected and, in step 804, the product document owner(s) notified.

Next, in step 806, product documents added to product document database within a pre-selected timeframe (for example within the last month) are selected. In step 808, it is determined if the client was a referral from a channel partner. If the referral was from a channel partner then, in step 810, any fees due the channel partner are calculated and, in step 812, payment is sent to the channel partner. Payment may be electronic or by check.

In step 814, a search for soon-to-expire publication slots in client accounts in accounts database 120 is performed, and in step 816, those clients are notified electronically regarding how many slots will expire and when they will expire.

According to step 818, product documents added to the product document database within a pre-selected timeframe (for example within the last month) are selected. In step 819, the document owner is notified electronically. In step, 820, those product documents selected in step 819 are placed on a recently published list, while older product documents are removed.

Finally, in step 821, a review of recent "hits" and "download" records is performed, and statistics compiled. In step 822, the statistics associated with a given product document are made available to the document owner.

Figure 24:
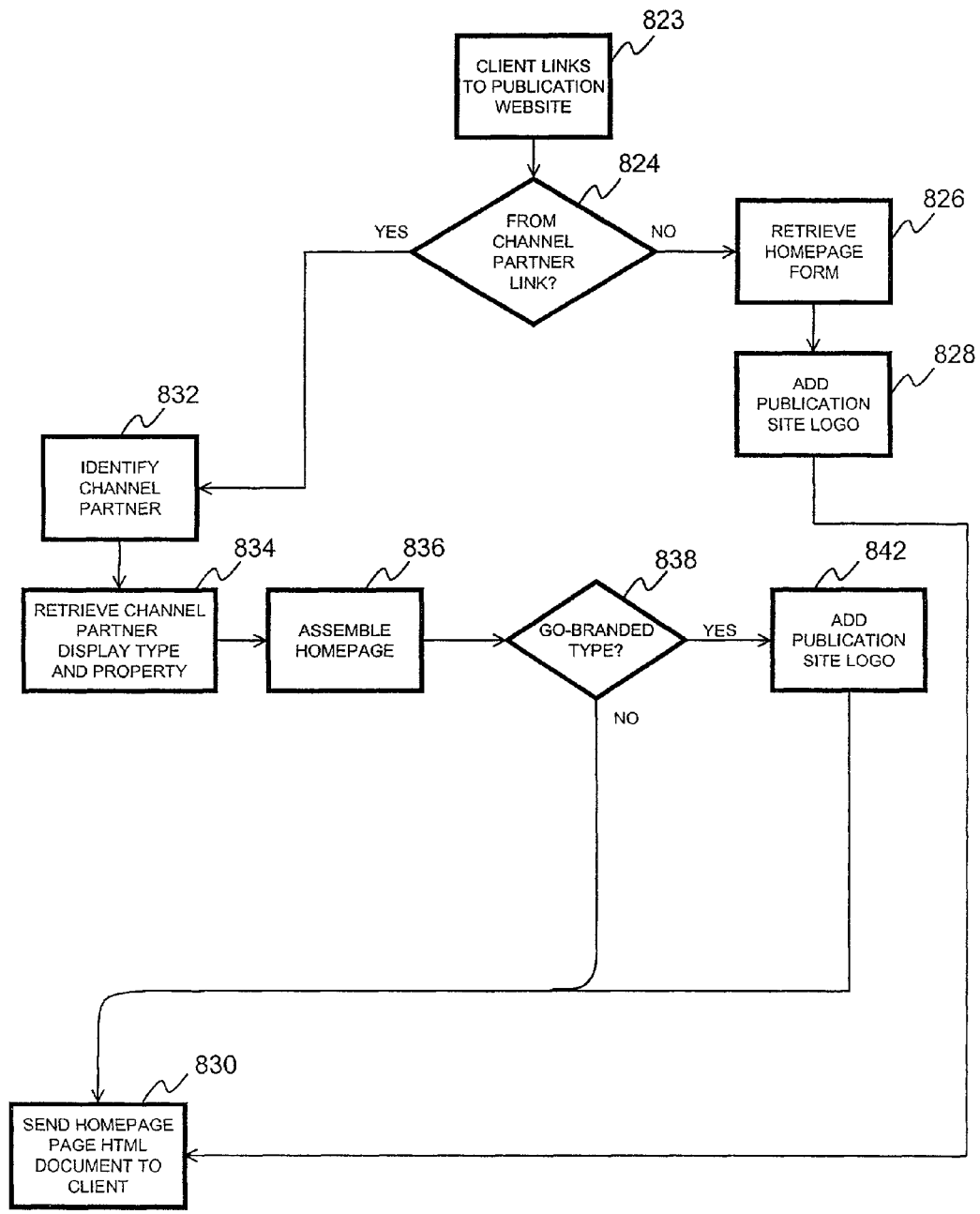
FIG. 24 is a flow diagram illustrating the method steps of determination and assembly of the publication Web site display screens, according to the present invention.

FIG. 24 is a flow diagram illustrating the method steps of determining and assembly of the publication Web site display screens, according to the present invention. The steps are described for a homepage, but the process is applicable to all screens. In step 823, client computer 180 links to publication Web site 100. In step 824, it is determined if the link in step 823 was a referral from a channel partner. If the link in step 823 was not from a channel partner then, in step 826, a homepage form is retrieved. In step 828, the publication Web site logo is added. In step 830, the homepage HTML document is sent to client computer 180. If, in step 824, it is determined that the link in step 823 was a referral from a channel partner then, in step 832, the channel partner is identified. In step 834, the channel partner display type and property is retrieved and, in step 836, a homepage is assembled. Next, in step 838, it is determined if the homepage is to be branded (only channel partner display properties are used) or co-branded (a publication Web site logo is added). If, in step 838, the homepage is co-branded then, in step 842, the publication Web site logo is added and, in step 830, the homepage HTML document is sent to client computer 180. If, in step 838, the homepage is not co-branded then, in step 830, the homepage HTML document is sent to client computer 180.

Figure 25A:
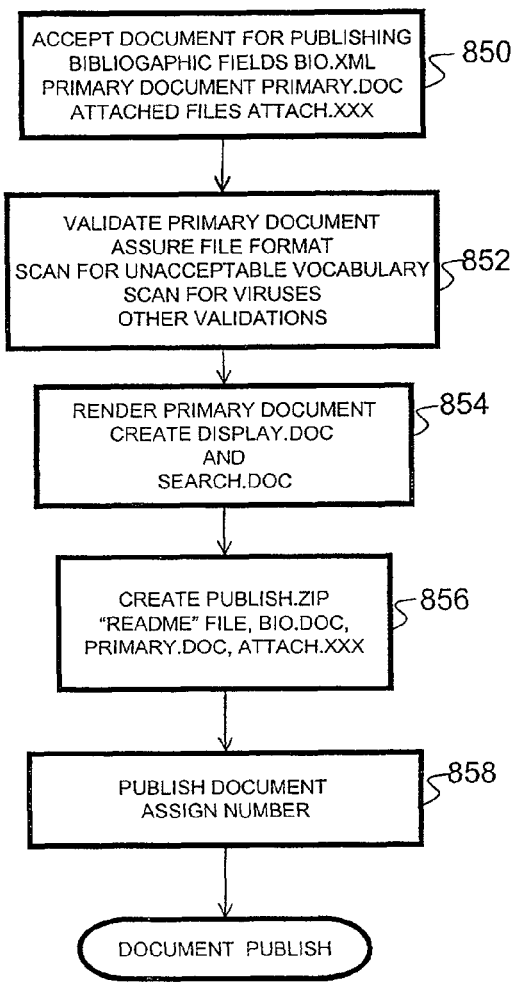
FIGS. 25A and 25B are flow diagrams illustrating an alternative method of notarizing the product documents, according to the present invention.
Figure 25B:
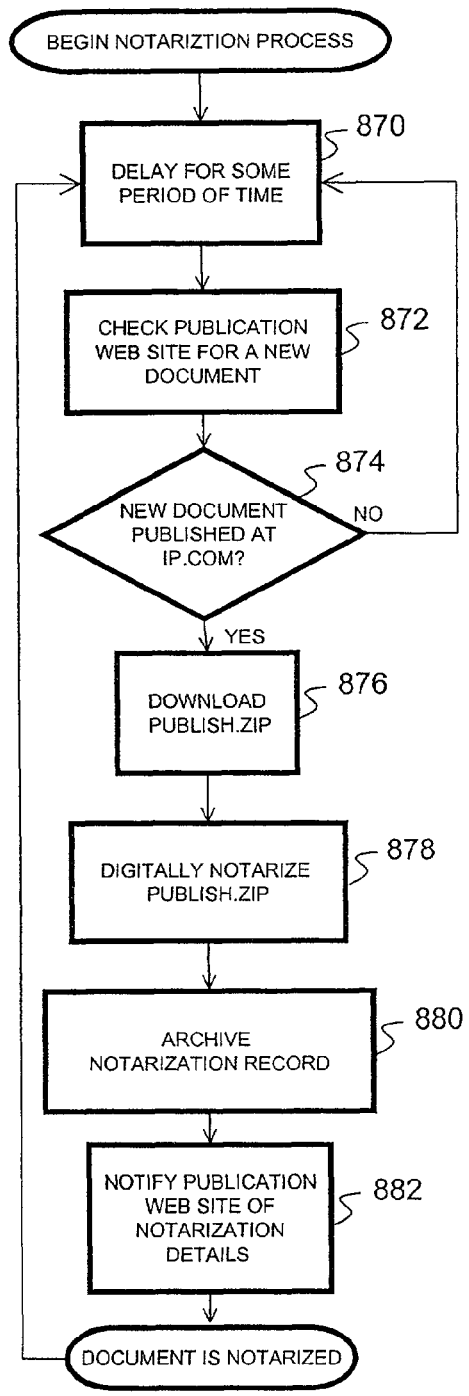

FIGS. 25A and 25B are flow diagrams illustrating an alternative method of notarizing the product documents, according to the present invention. FIG. 25A illustrates the activities of publication Web site 100 acting through Web server 110. FIG. 25B illustrates the activity of auxiliary Web site 290 that acts as an intermediary between publication Web site 100 and notary Web site 302.

Turning to FIG. 25A, in step 852, document files are accepted from client computer 180 for publishing. The document files include the bibliographic data file, the primary product document file, and the attachment file(s). Then, in step 8525 the validation process illustrated in FIG. 15 and described above is performed. Next, in step 854, the display document file and the search document file are created. In step 856, the compressed product document file is created which includes the read-me file, the bibliographic data file, the primary product document file, and the attachment file(s). Finally, in step 858, a publication number is assigned and the search document and display document files are written to search database 150 and the compressed product document file is written to product document database 140.

Now turning to FIG. 25B, step 870 involves invoking a delay period (e.g. less than one second) to regulate polling of publication Web site 100 for new product documents. In step 872, auxiliary Web site 290 polls publication Web site 100 for a new product document(s) via Global Information Network 220. If, in step 874, a new product document(s) is/are found, then in step 876 a copy of the new product document(s) is/are downloaded from publication Web site 100. If, in step 874, no new product document(s) is/are found, then the process loops back to delay step 870. Returning to step 876, after this step, in the next step 878, a digital fingerprint of the product document(s) is sent to notary Web site 300 and a notary file is received back. Next, in step 880, the notary file is stored on auxiliary database 296. In step 882, publication Web site 100 is notified of the notarization event date and time. Optionally, the file name of the notary file is included in the notification.

Figure 26:
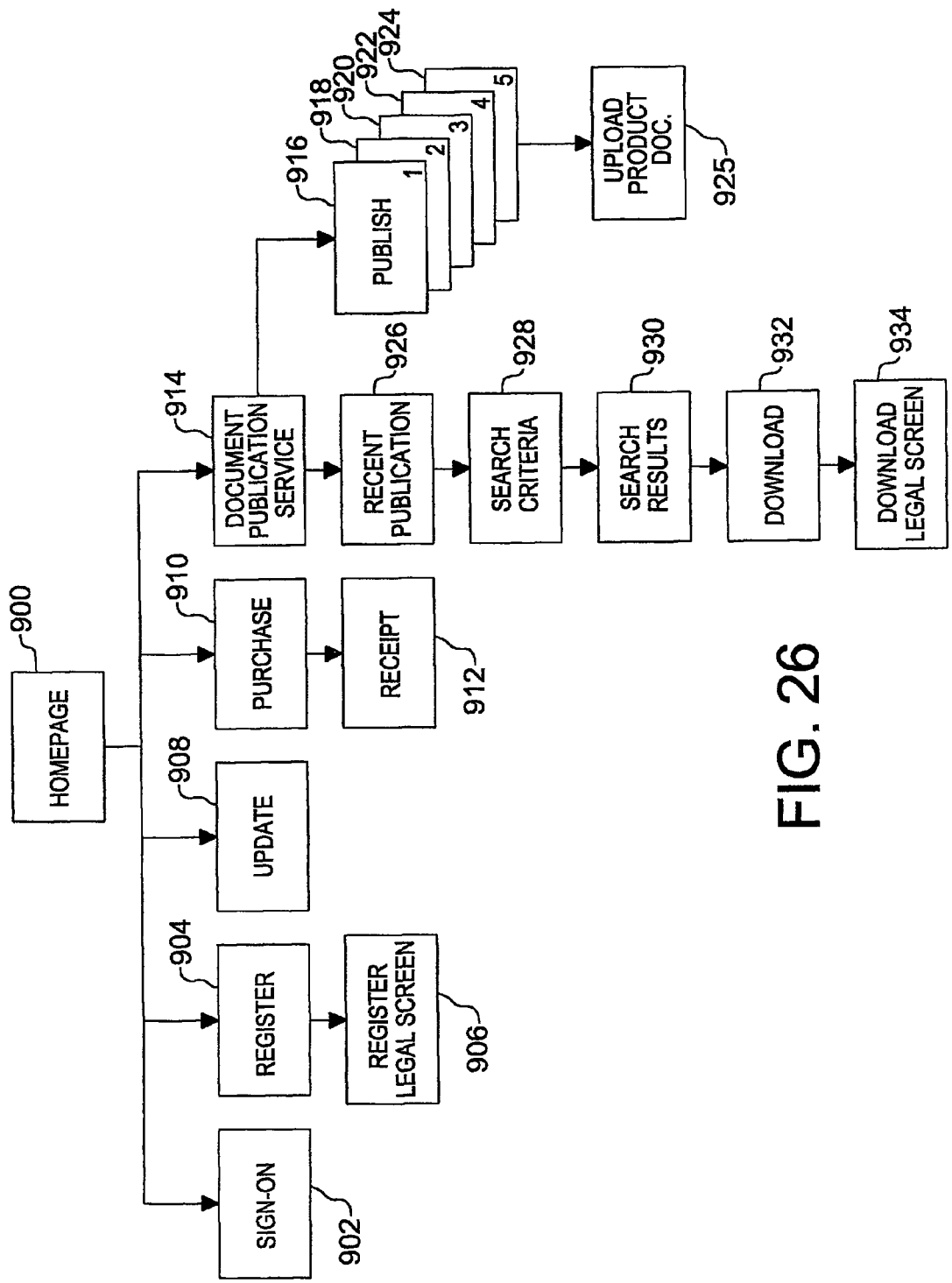
FIG. 26 is a diagram illustrating the organization of screen displays, according to the present invention.

FIG. 26 is a diagram illustrating the organization of screen displays, according to the present invention. A homepage 900 contains links to a sign-on page 902, a register page 904 linked to a registration terms and conditions page 906, a registration update page 908, a purchase publication page 910 that enables a client to purchase product publication slot(s) and is linked to a purchase publication confirmation page 912, and a document publication service page 914. The document publication service page 914 links to a recent publications page 926 which in turn links to a set of search pages 928, 930, 932, and the document publication service page also links to a set of publishing wizard pages 916, 918, 920, 922, and 924. Certain of these pages are illustrated and described in detail below. It should be understood, in the descriptions that follow, that the client or user is entering information or clicking links or buttons from a Web browser on his or her own client computer 180 or user computer connected to Global Information Network 220.

Figure 27:
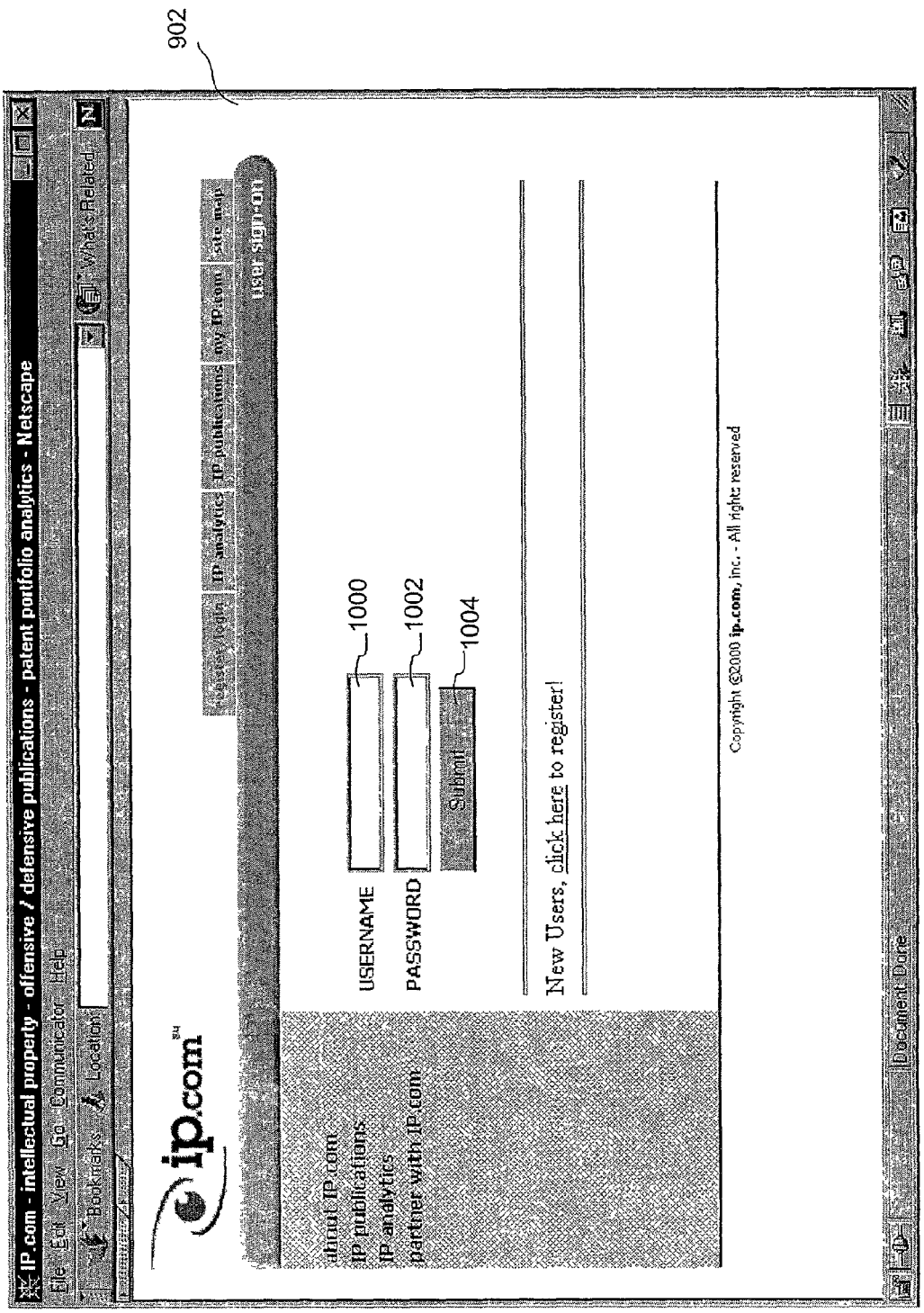
FIG. 27 is an exemplary screen display illustrating a publication Web site sign-on page, according to the present invention.

FIG. 27 is an exemplary screen display illustrating the product publication Web site sign-on page 902 in further detail. Sign-on page 902 is for use by clients already registered with publication Web site 100 and includes a user name text box 1000 and a password text box 1002. After filling user name text box 1000 and password text box 1002, the client clicks "submit" button 1004 to initiate a session on publication Web site 100.

Figure 28:
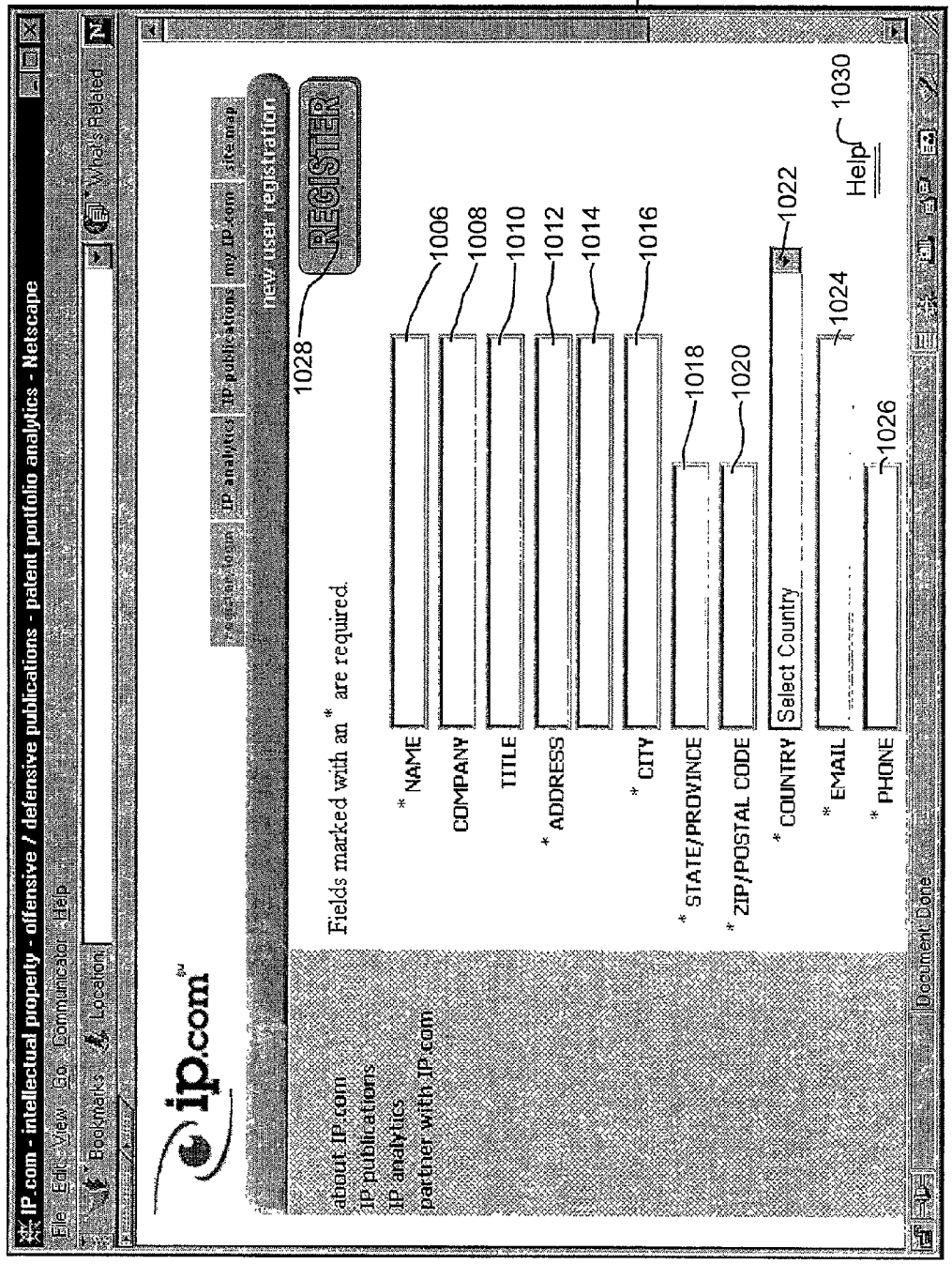
FIG. 28 is an exemplary screen display illustrating a publication Web site registration page, according to the present invention.

FIG. 28 is an exemplary screen display illustrating the product publication Web site registration page 904. Registration page 904 is for use by those who do not have an account but that wish to avail themselves of the publication facilities of publication Web site 100. Registration page 904 includes a name text box 1006, a company text box 1008, a title text box 1010, a pair of address text boxes 1012 and 1014, a city text box 1016, a state/province text box 1018, a zip/postal code text box 1020, a country combo-box 1022 providing a menu of selectable countries, an e-mail address text box 1024, and a telephone number text box 1026. After filling in the aforementioned text boxes, the client clicks on "register" button 1028 to start creation of an account. A user name for the client is generated from the e-mail address provided in text box 1024, and a password for the client is arbitrarily generated. Register page 904 also includes a help link 1030.

FIG. 29 shows product document publication service page 914 through which a client can choose to upload a new product document for publication, or a client or user can choose to search the product documents published through Web site 100. Accordingly, the product document publication service page 914 includes a New Publication link 1032 and a Search Publications link 1034.

Figure 30:
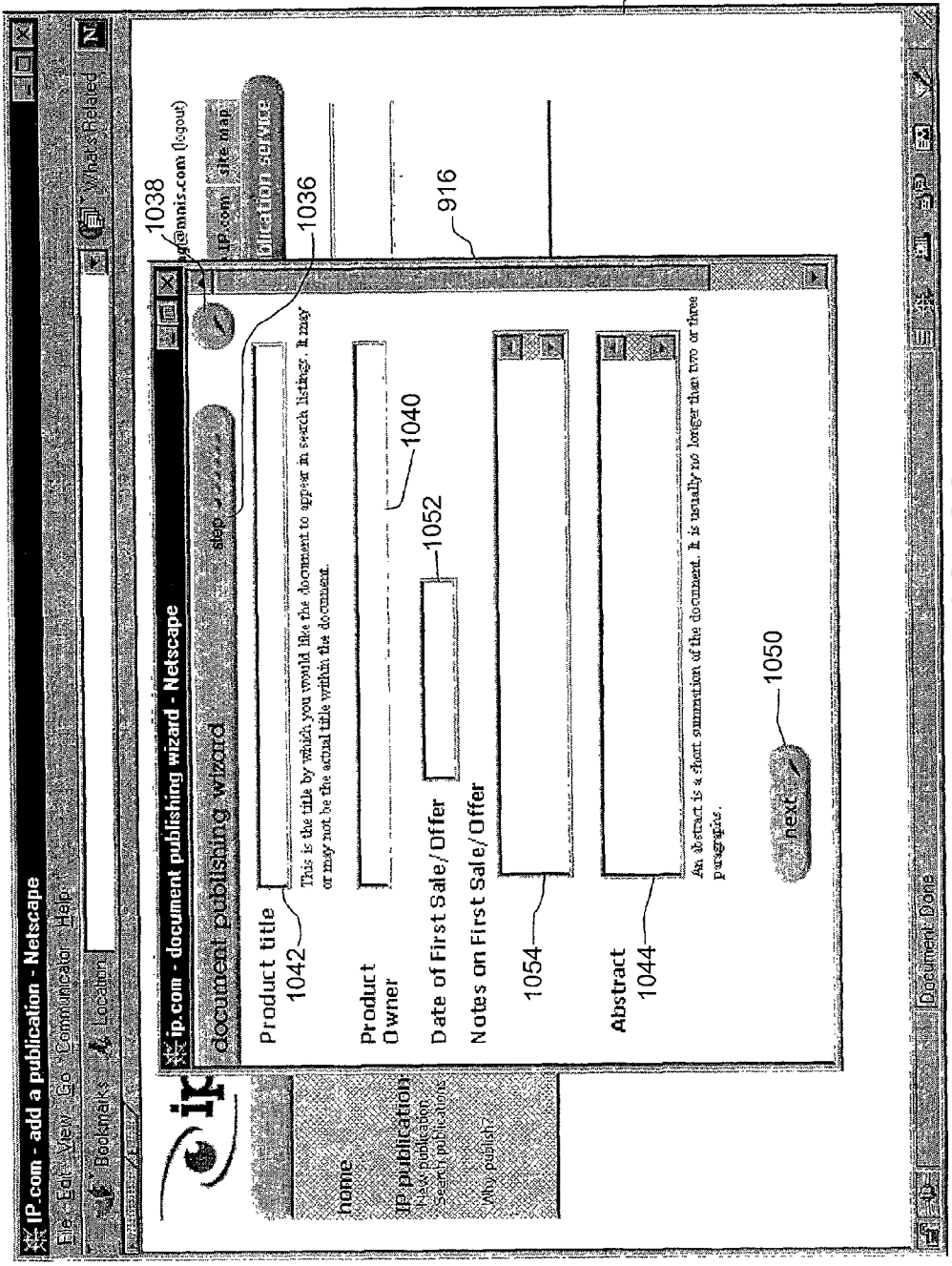
FIGS. 30 through 34 are exemplary screen displays illustrating a series of publication Web site publishing wizard pages, according to the present invention.

FIGS. 30 through 34 correspond to exemplary screen displays illustrating the product publication Web site publishing wizard pages 916, 918, 920, 922, and 924. FIG. 30 illustrates a first publishing wizard page 916 that includes a step counter 1036, a forward button 1038, a product owner text box 1040, a product title text box 1042, an abstract text box 1044, a "publish with authorship" option button (not shown), a "publish anonymously" option button (not shown), and a "next" button 1050. First publishing wizard page 916 further includes a "date of first sale/offer" text box 1052 and a "notes on first sale/offer" text box 1054, whereby the client can enter date information for calculating an "on sale" statutory bar period as well as details regarding the first sale or offer for sale of the product in question. Clicking the "publish with authorship" option button causes the information entered in owner text box 1040 to be included in the published product document. Conversely, clicking the "publish anonymously" option button causes the information entered in owner text box 1040 to be excluded from the product document. Clicking either forward button 1038 or "next" button 1050 will display second publishing wizard page 918.

Figure 31:
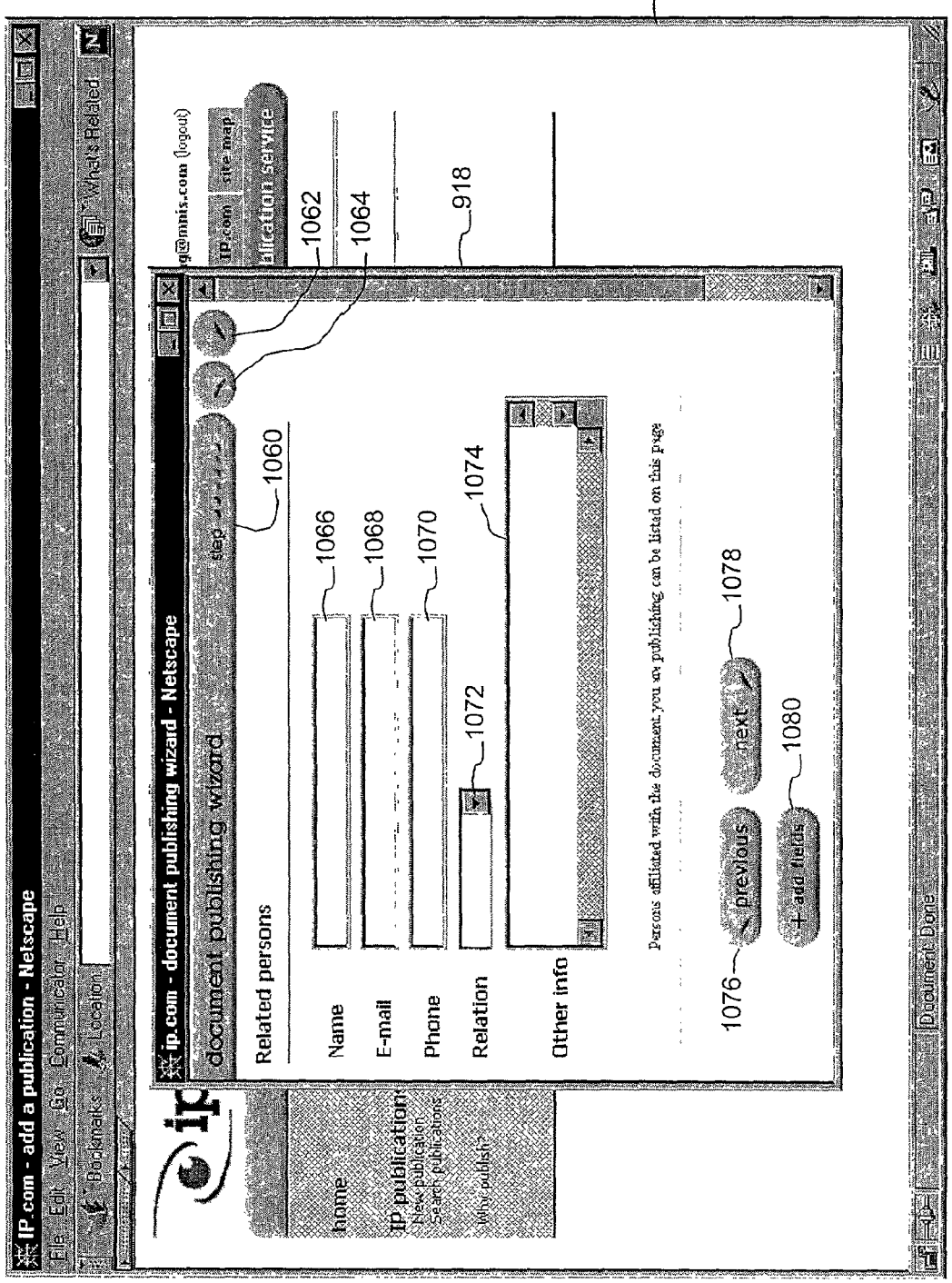

Illustrated in FIG. 31 is second publishing wizard page 918 for entering information identifying persons related to the product, such as marketing personnel, product developers, inventors, etc. Second publishing wizard page 918 includes a step counter 1060, a forward button 1062, a back button 1064, a name text box 1066, an e-mail text box 1068, a phone number text box 1070, a relation combo box 1072, an other information text box 1074, a previous button 1076, a "next" button 1078, and an "add fields" button 1080. If "publish anonymously" button 1046B was clicked previously on first publishing wizard page 916, this information will be excluded from the published document. Clicking "add fields" button 1080 brings up another set of text boxes for additional related persons. Clicking either forward button 1062 or "next" button 1078 will display third publishing wizard page 920. Clicking either back button 1064 or "previous" button 1076 will display first publishing wizard page 916.

Figure 32:
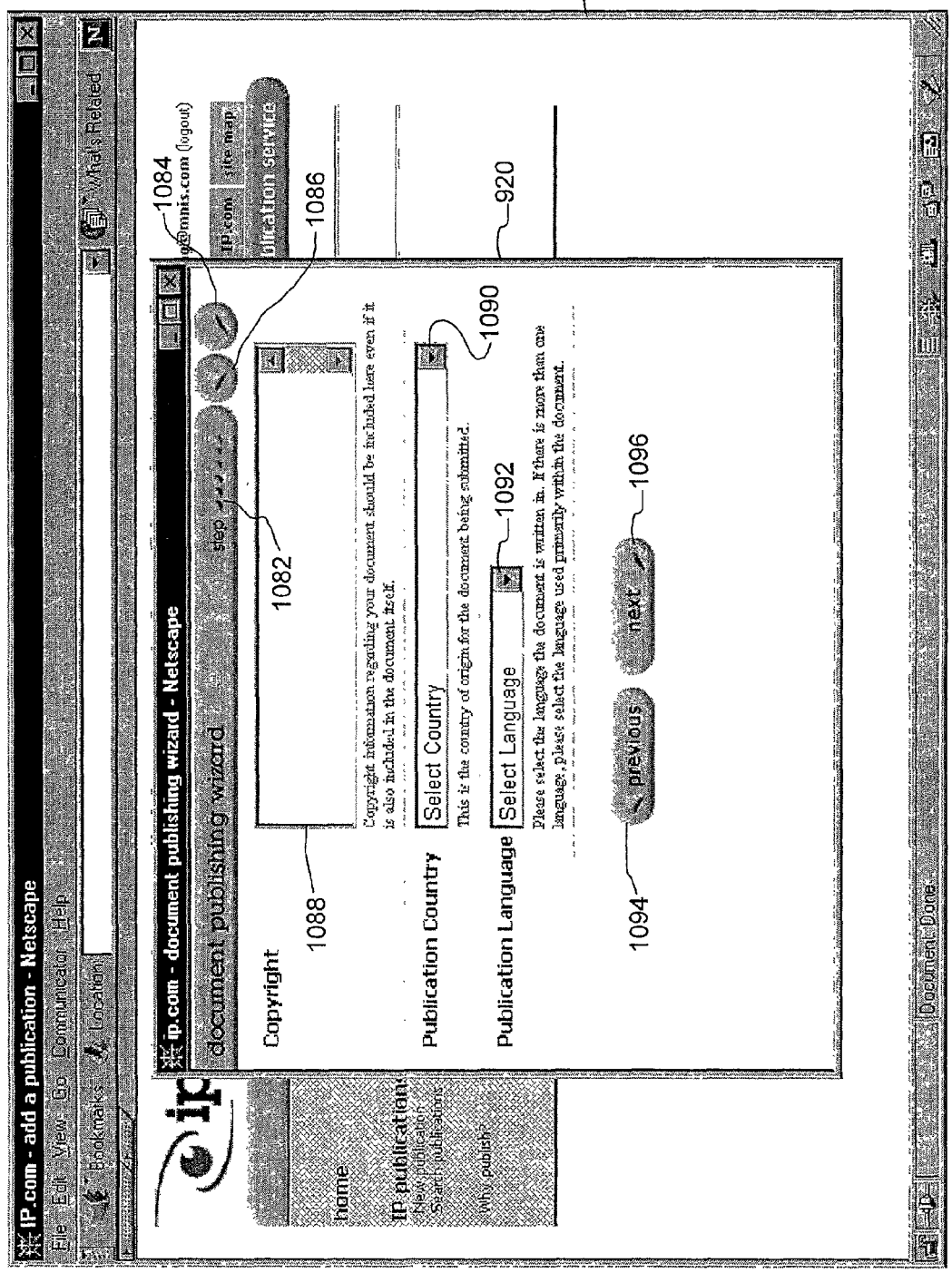

Illustrated in FIG. 32 is third publishing wizard page 920. Third publishing wizard page 918 includes step counter 1082, forward button 1084, back button 1086, a copyright text box 1088 for entering copyright information, a publication country combo box 1090, a publication language combo box 1092, a "previous" button 1094, and a "next" button 1096. Clicking either forward button 1084 or "next" button 1096 will display fourth publishing wizard page 922. Clicking either back button 1086 or "previous" button 1094 will display second publishing wizard page 918.

Figure 33:
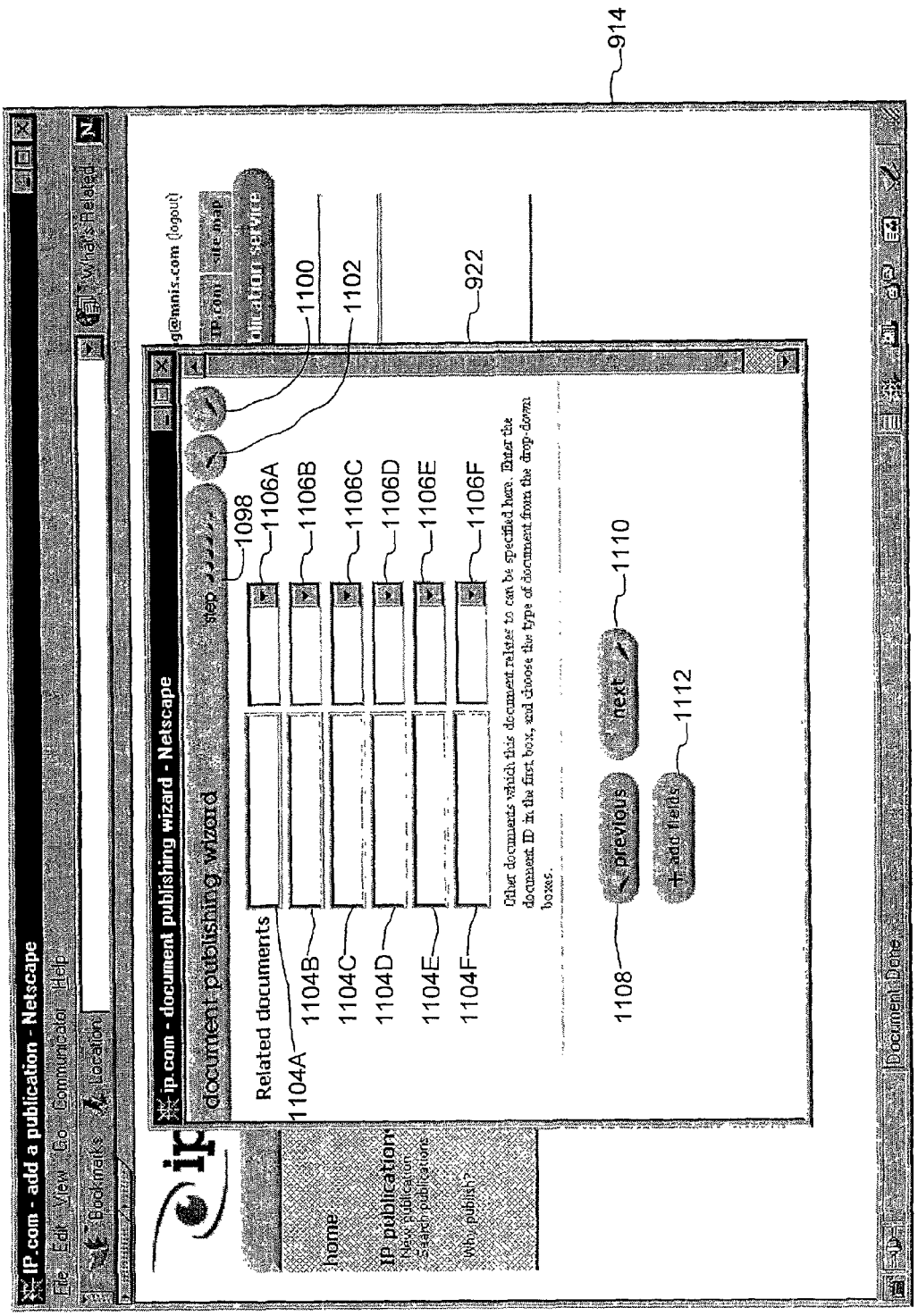

FIG. 33 shows a fourth publishing wizard page 922 that includes a step counter 1098, a forward button 1100, back button 1102, a plurality of related document ID text boxes 1104A, 1104B, 1104C, 1104D, 1104E, and 1104F, a set of related document type combo boxes 1106A, 1106B, 1106C, 1106D, 1106E, and 1106F, a "previous" button 1108, a "next" button 1110, and an "add fields" button 1112. Document ID's are publication site product document identifying numbers. Clicking "add fields" button 1112 brings up additional related document ID text boxes and document type combo boxes. Clicking either forward button 1100 or "next" button 1110 will display fifth publishing wizard page 924. Clicking either back button 1102 or "previous" button 1108 will display third publishing wizard page 920.

Figure 34:
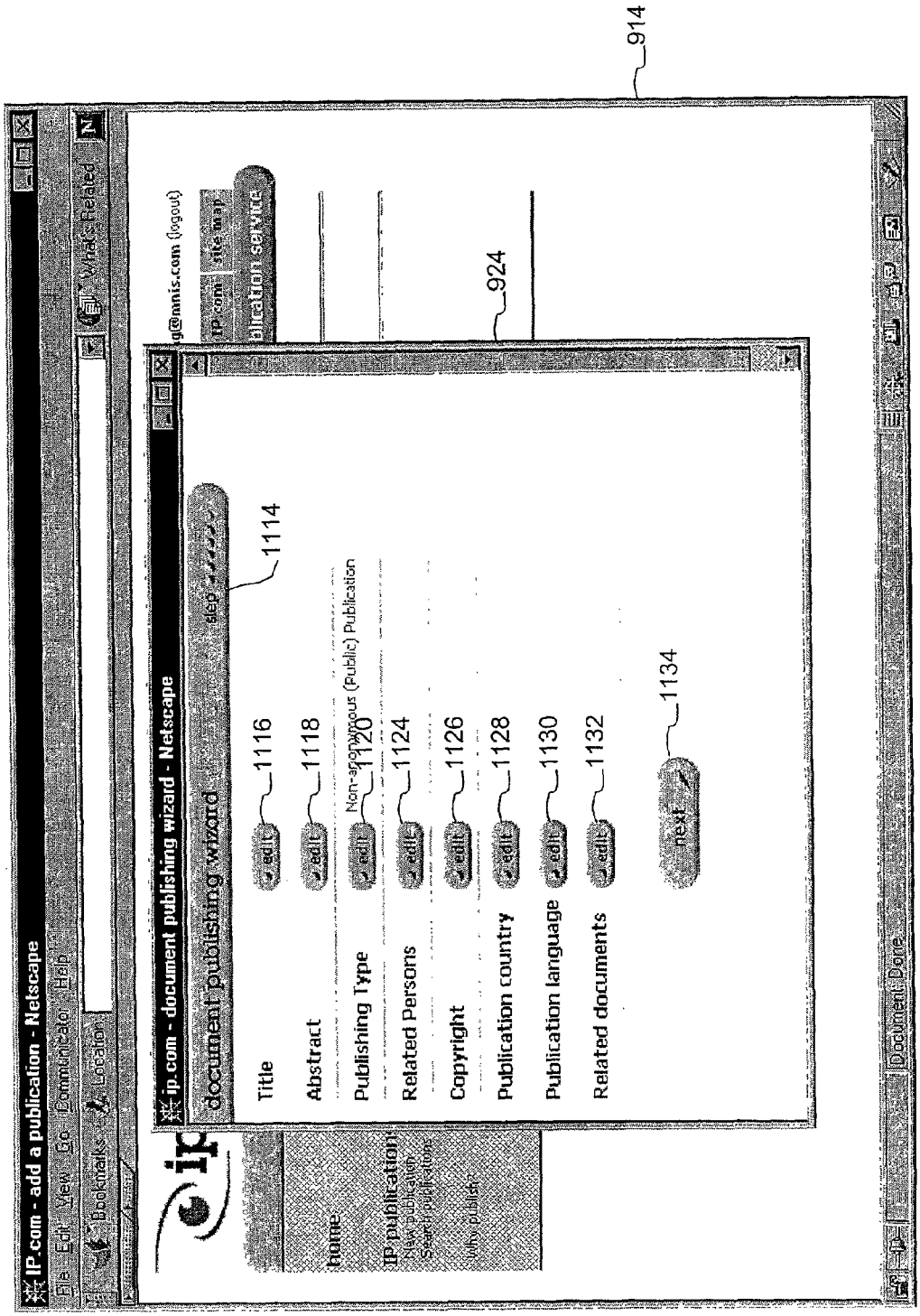

Referring finally to FIG. 34, fifth publishing wizard page 924 is shown for allowing the client to make any changes in the product information entered at pages 916, 918, 920, and 922. Fifth publishing wizard page 924 includes a step counter 1114, a "title" edit button 1116, an "abstract" edit button 1118, a "publishing type" edit button 1120, a "related person (s)" edit button 1124, a "copyright" edit button 1126, a "publication country" edit button 1128, a "publication language" edit button 1130, a "related documents" edit button 1132, and a "next" button 1134. Clicking any of the "edit" buttons brings up the corresponding document publishing wizard page that the particular information was first entered on. Clicking "next" button 1132 will display upload page 925.

Figure 35:
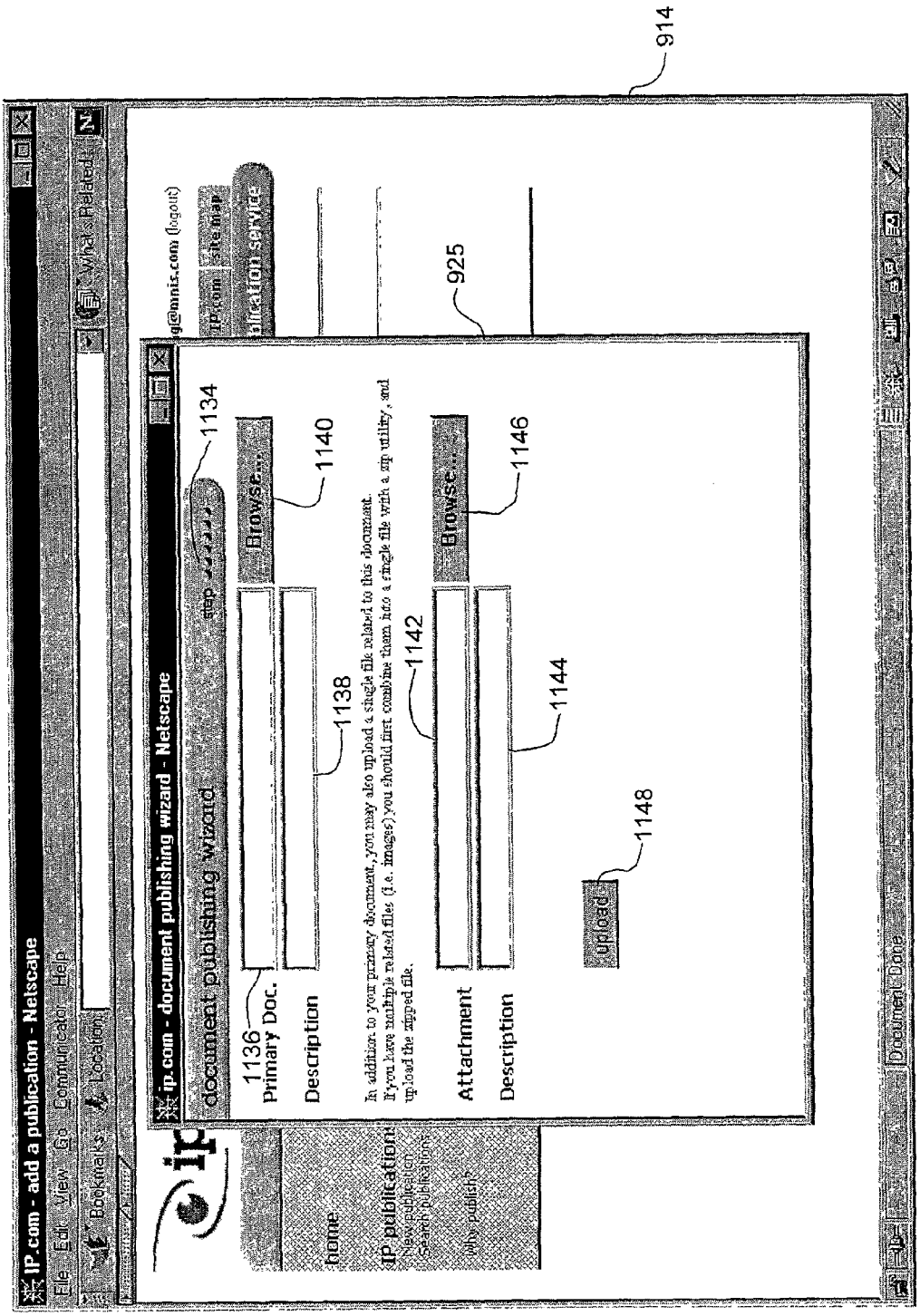
FIG. 35 is an exemplary screen display illustrating a publication Web site upload page, according to the present invention.

Illustrated in FIG. 35 is upload page 925. Upload page 925 includes step counter 1134, a primary document text box 1136, a first description text box 1138, a first "browse" button 1140, an attachment text box 1142, a second description text box 1144, a second "browse" button 1146, and an "upload" button 1148. Clicking, first "browse" button 1158 allows the client to select a primary document file from client computer 180. Clicking, second "browse" button 1164 allows the client to select an attachment file from client computer 180. Multiple attachment files should be "zipped" into a single file. Clicking "upload" button 1148 transmits the data entered on the previous document publishing wizard pages, the primary document file, and the attachment file to publication Web site 100 from client computer 180.

The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

What is claimed is:

1. A method of publishing a product document, said method comprising the steps of:
providing by a computer a searchable document database and a publication Web site in communication with said document database, where said database is publicly accessible;
electronically receiving by a computer a product document transmitted by a client's computer, where said product document provides information regarding a commercially available product; publishing by a computer said product document by adding said product document to said document database, wherein said publishing is for the purpose of disclosing information about a product to establish a bar to patentability of inventions practiced in said product; and,
digitally notarizing by a computer said product document and obtaining a document notarization record, said document notarization record including a timestamp and a digital fingerprint.

2. The method of claim 1, wherein said product document comprises a primary document and one or more attachment files.

3. The method of claim 2, wherein said attachment files include a sample deposition statement.

4. The method of claim 2, wherein said attachment files include an image of a sales brochure.

5. The method of claim 2, wherein said attachment files include an image of a purchase order.

6. The method of claim 2, wherein said attachment files include an image of a sales invoice.

7. The method of claim 2, wherein said attachment files include an image of a commercial Web site page.

8. The method of claim 2, wherein said attachment files include an image of a printed advertisement.

9. The method of claim 2, wherein said attachment files include a video clip.

10. The method of claim 2, wherein said attachment files include an audio clip.

11. The method of claim 1, wherein said step of digitally notarizing said product document and obtaining a document notarization record is performed by a notarization vender Web site in communication with said database.

12. The method of claim 1, further comprising the step of charging said client a fee for adding said product document to said database.

13. The method of claim 12, wherein said fee is paid before said product document is added to said database.

14. The method of claim 1, further comprising the step of recording the number of times said product document is accessed by end users.

15. The method of claim 1, wherein said product document includes an earliest date of commercial availability of said product associated with said product document, and said method further comprises the step of transmitting to said client's computer a notice of time remaining to file a patent application under applicable law on matter incorporated in said product based on said earliest date of commercial availability.

16. The method of claim 15, wherein said earliest date of commercial availability is a date said product was first "on sale" in the United States under United States patent Laws.

17. The method of claim 1, further comprising the step of collecting and adding bibliographic data to said product document.

18. The method of claim 1, wherein said product document is transmitted by said client's computer via one of a plurality of transfer protocols determined by said client.

19. The method of claim 18, wherein said plurality of transfer protocols includes the HTTP and FTP.

20. The method of claim 1, wherein said product document is published on a restricted basis for access only by users and user groups selected by said client.

21. A Web based system for publishing a product document, said system comprising:
a searchable document database, where said database is publicly accessible; and
a publication Web site in communication with said document database, said publication Web site including means for electronically receiving a product document transmitted by a client's computer and means for adding said product document to said database, wherein said publication Web site is for the purpose of disclosing information about a product to establish a bar to patentability of inventions practiced in said product and wherein said product document provides information regarding a commercially available product; and,
means for digitally notarizing said product document and obtaining a document notarization record, said document notarization record including a timestamp and a digital fingerprint.

22. The system of claim 21, wherein said product document comprises a primary document and one or more attachment files.

23. The system of claim 22, wherein said attachment files include a sample deposition statement.

24. The system of claim 22, wherein said attachment files include an image of a sales brochure.

25. The system of claim 22, wherein said attachment files include an image of a purchase order.

26. The system of claim 22, wherein said attachment files include an image of a sales invoice.

27. The system of claim 22, wherein said attachment files include an image of a commercial Web site page.

28. The system of claim 22, wherein said attachment files include an image of a printed advertisement.

29. The system of claim 22, wherein said attachment files include a video clip.

30. The system of claim 22, wherein said attachment files include an audio clip.

31. The system of claim 21, wherein said means for digitally notarizing said product document and obtaining a document notarization record is provided by a notarization vender Web site in communication with said database.

32. The system of claim 21, further comprising means for charging said client a fee for adding said product document to said database.

33. The system of claim 32, wherein said fee is paid before said product document is added to said database.

34. The system of claim 21, further comprising means for recording the number of times said product document is accessed by end users.

35. The system of claim 21, wherein said product document includes an earliest date of commercial availability of said product associated with said product document, and said system further comprises means for transmitting to said client's computer a notice of time remaining to file a patent application under applicable law on matter incorporated in said product based on said earliest date of commercial availability.

36. The system of claim 35, wherein said earliest date of commercial availability is a date said product was first "on sale" in the United States under United States Patent Laws.

37. The system of claim 21, further comprising means for collecting and adding bibliographic data to said product document.

38. The system of claim 21, wherein said product document is transmitted by said client's computer via one of a plurality of transfer protocols determined by said client.

39. The system of claim 38, wherein said plurality of transfer protocols includes the HTTP and FTP.

40. The system of claim 21, wherein said product document is published on a restricted basis for access only by users and user groups selected by said client.

* * * * *